US 9,169,580 B2

(12) United States Patent
Griggs et al.

(10) Patent No.: US 9,169,580 B2
(45) Date of Patent: Oct. 27, 2015

(54) APPARATUS FOR FORMING FIBER BALLS WITH CLIPPERS AND RELATED METHODS

(71) Applicant: Tipper Tie, Inc., Apex, NC (US)

(72) Inventors: Samuel D. Griggs, Raleigh, NC (US); Dennis J. May, Pittsboro, NC (US)

(73) Assignee: Tipper Tie, Inc., Apex, NC (US)

( * ) Notice: Subject to any disclaimer, the term of this patent is extended or adjusted under 35 U.S.C. 154(b) by 235 days.

(21) Appl. No.: 13/674,495

(22) Filed: Nov. 12, 2012

(65) Prior Publication Data
US 2013/0125346 A1 May 23, 2013

Related U.S. Application Data

(60) Provisional application No. 61/562,511, filed on Nov. 22, 2011, provisional application No. 61/658,578, filed on Jun. 12, 2012.

(51) Int. Cl.
*D01G 19/06* (2006.01)
*B65B 51/04* (2006.01)
*C02F 1/00* (2006.01)
*C02F 1/28* (2006.01)
*D04D 7/06* (2006.01)

(52) U.S. Cl.
CPC ............... *D01G 19/06* (2013.01); *B65B 51/04* (2013.01); *C02F 1/001* (2013.01); *C02F 1/286* (2013.01); *D04D 7/06* (2013.01)

(58) Field of Classification Search
CPC ............. C02F 3/04; C02F 3/06; C02F 3/085; B01J 19/30; B01J 2219/30207; D04D 7/06; D01G 19/06; B65B 51/04
See application file for complete search history.

(56) References Cited

U.S. PATENT DOCUMENTS

| 2,880,419 | A | | 4/1959 | Tipper et al. |
| 3,389,533 | A | | 6/1968 | Tipper et al. |
| 3,400,433 | A | | 9/1968 | Klenz et al. |
| 3,499,259 | A | | 3/1970 | Tipper et al. |
| 4,525,898 | A | | 7/1985 | Gallion et al. |
| 4,683,700 | A | | 8/1987 | Evans et al. |
| 4,766,713 | A | | 8/1988 | Evans |
| 4,944,172 | A | | 7/1990 | Evans |
| 4,993,135 | A | | 2/1991 | Seeley et al. |
| 5,161,347 | A | * | 11/1992 | May et al. ..................... 53/138.2 |
| 5,248,415 | A | * | 9/1993 | Masuda et al. ................ 210/154 |
| 5,495,701 | A | | 3/1996 | Poteat et al. |
| 5,587,239 | A | | 12/1996 | Ueba et al. |
| 5,985,148 | A | | 11/1999 | Liu |

(Continued)

OTHER PUBLICATIONS

QLJ Fiber Ball Filter, YangZhou Chenglu Environmental Engineering Co., Ltd., http://www.ceec-wastewater.com/fiber-ball-filter.html, date unknown but believed to be prior to Nov. 22, 2011, printed from the internet Oct. 17, 2011, 1 page.

(Continued)

*Primary Examiner* — Shaun R Hurley
(74) *Attorney, Agent, or Firm* — Myers Bigel Sibley & Sajovec, P.A.

(57) ABSTRACT

An apparatus for forming fiber balls uses automated clippers that can cooperate with a wheel that turns and operates in a stop and go sequence to hold gathered segments of lengths of elongate fibers, then present the gathered segments to a clipper, then rotate with the clipped segments of elongate fibers, allowing a knife or blade to extend to cut between adjacent clipped segments to form fiber balls with a clip or clips at a medial portion thereof.

27 Claims, 28 Drawing Sheets

(56) References Cited

U.S. PATENT DOCUMENTS

| | | | |
|---|---|---|---|
| 7,536,838 B2 | 5/2009 | Whittlesey et al. | |
| 2003/0111431 A1* | 6/2003 | Dew, Jr. | 210/807 |
| 2004/0226897 A1* | 11/2004 | Boner et al. | 210/793 |
| 2005/0034426 A1* | 2/2005 | Griggs et al. | 53/417 |
| 2005/0039419 A1* | 2/2005 | Griggs et al. | 53/417 |
| 2008/0017581 A1 | 1/2008 | Eriksen et al. | |
| 2013/0001161 A1* | 1/2013 | Boner | 210/615 |
| 2013/0125346 A1* | 5/2013 | Griggs et al. | 19/145 |

OTHER PUBLICATIONS

Fiber Ball for waste water treatment, Xianke Brand, http://www.alibaba.com/product-gs/486795053/Alibaba_Hot_Selling . . . , date unknown but believed to be prior to Nov. 22, 2011, printed from the internet Oct. 17, 2011, 4 pages.

* cited by examiner

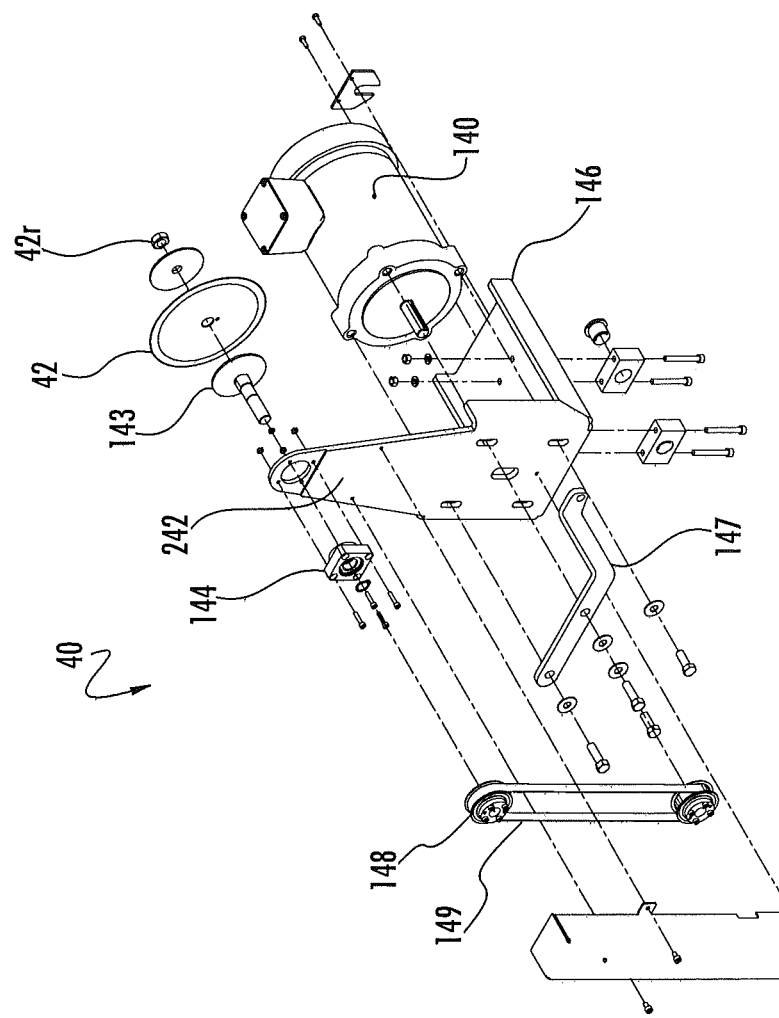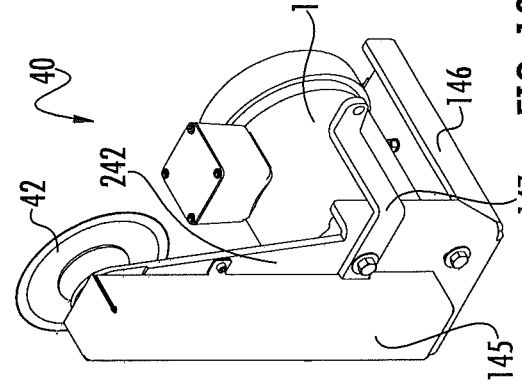

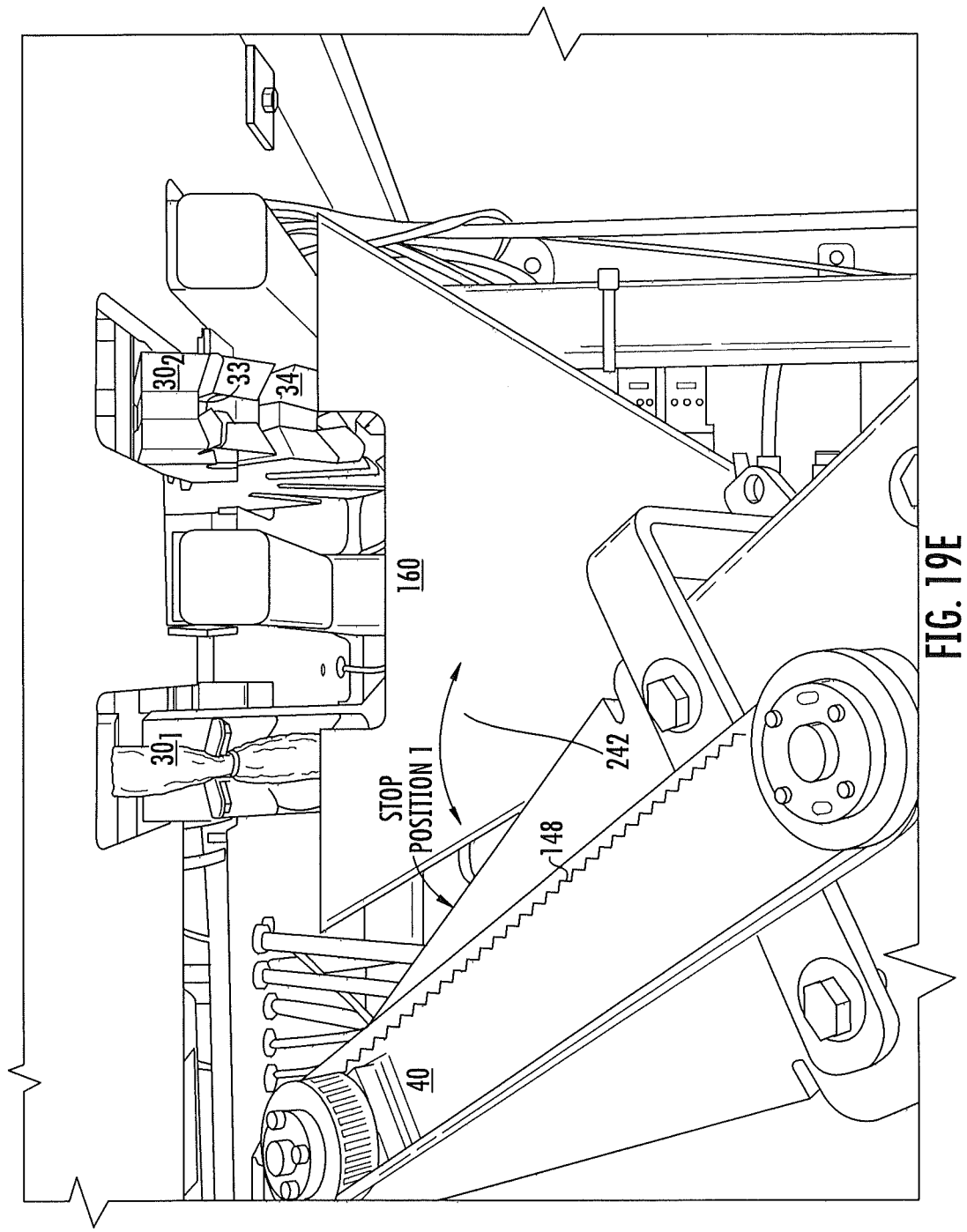

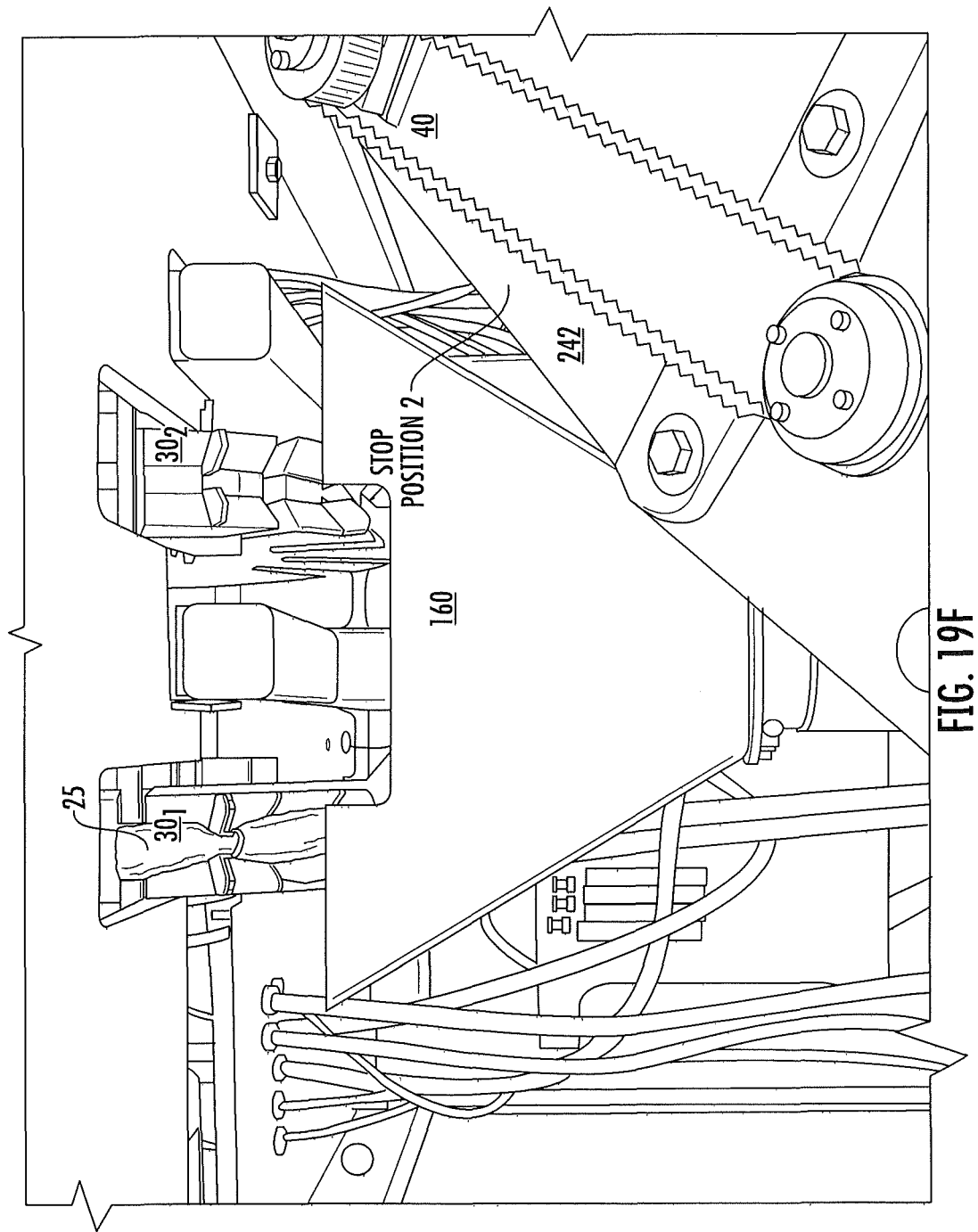

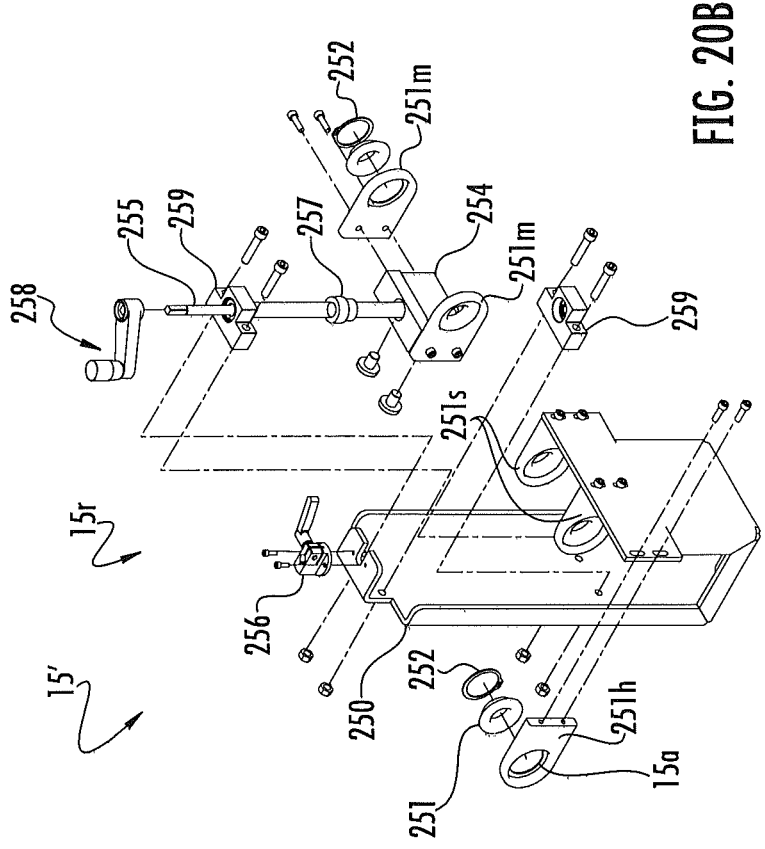
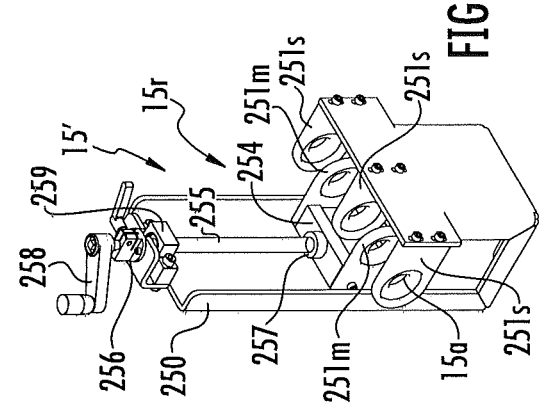

APPARATUS FOR FORMING FIBER BALLS WITH CLIPPERS AND RELATED METHODS

RELATED APPLICATIONS

This application claims priority to and the benefit of U.S. Provisional Application Ser. No. 61/562,511, filed Nov. 22, 2011, and U.S. Provisional Application Ser. No. 61/658,578, filed Jun. 12, 2012, the contents of which are hereby incorporated by reference as if recited in full herein.

FIELD OF THE INVENTION

The present invention relates to apparatus, systems, methods and computer program products that fabricate fiber balls.

BACKGROUND OF THE INVENTION

Fiber balls have been used in wastewater and other water treatment systems. In the past, fiber balls have been made from plastic balls and wool bundles as described in U.S. Pat. No. 5,985,148 and from bundled fused fibers as described, for example, in U.S. Pat. No. 5,587,239. The contents of these documents are hereby incorporated by reference as if recited in full herein.

Despite the above, there remains a need for alternative, economic fiber ball formation systems.

SUMMARY OF EMBODIMENTS OF THE INVENTION

Embodiments of the present invention provide systems, methods and computer program products that form fiber balls using at least one automated clipper that clips spaced apart lengths of elongate fibers.

Some embodiments are directed to apparatus for forming fiber balls that includes: (a) at least one automated clipper; (b) at least one wheel in cooperating alignment with the at least one clipper configured to rotate and releasably engage lengths of fibers; (c) a drive system in communication with the at least one wheel to rotate the wheel; and (d) at least one cutting mechanism in cooperating alignment with the at least one wheel.

The wheel can include a perimeter with a plurality of circumferentially spaced apart fiber holding members or segments.

The apparatus can include a controller in communication with the at least one clipper, the at least one wheel, the at least one cutting mechanism and the drive system. The controller can direct the wheel to index to stop a plurality of times per revolution.

The apparatus can include a controller in communication with the drive system and the at least one clipper. The controller can be configured to direct the drive system to direct the wheel to stop as the clipper applies a clip to a segment of bundled fibers at a location that is upstream of the wheel.

The wheel can be indexed to stop and advance a plurality of times per revolution of the at least one wheel. The at least one cutting mechanism can be configured to travel from a home position to a cutting position when the wheel is stopped.

The apparatus can include a controller in communication with the at least one clipper and the at least one cutting mechanism to synchronize a clipping operation with a cutting operation.

The apparatus can include a table with a top surface that holds the at least one clipper. The table top surface can include at least one aperture or open space that allows a lower portion of the at least one wheel to reside under the table top surface. The at least one cutting mechanism is a single cutting mechanism that resides under the table top surface.

The at least one wheel can include at least first and second spaced apart wheels. The first and second wheels can be both attached to a common drive shaft of the drive system. The drive system can include an electric motor with a gearbox that drives the first and second wheels to index in concert.

The at least one wheel can have an outer perimeter with circumferentially spaced apart, radially-extending cutting channels. The cutting mechanism comprises a blade that, in operation moves to cut across a respective cutting channel to cut fibers held thereat.

The at least one cutting mechanism has a cutting member that has a stroke cycle that allows the cutting member to cut in forward and reverse travel directions during successive cutting operations.

The apparatus can include a bundle of elongate fibers extending from at least one supply source residing upstream of the at least one clipper. Clipped segments of the bundles of fibers can be releasably held on a respective wheel for less than one revolution of the wheel.

Other embodiments are directed to methods of making fiber balls. The methods include: (a) providing a bundle of elongate fibers; (b) automatically serially applying clips to the bundle of elongate fibers at longitudinally spaced apart locations; then (c) automatically serially cutting segments of the clipped bundle of fibers to form fiber balls.

The method can include, after the clips are applied, wrapping the bundle of fibers with clips on a wheel indexed to stop and advance a number of times per revolution, then the cutting step is carried out to serially cut segments of the bundle of fibers while the bundle of fibers with clips is on the wheel to form the fiber balls.

The method can include automatically indexing the wheel with the bundles of fibers with the clips to successively start and stop a number of times per revolution of the wheel, wherein the clipping and cutting operations are carried out substantially concurrently while the wheel is stopped.

The method can include holding the clipped bundle of fibers against an outer perimeter of the rotatable wheel, with spaced apart clips held between radially-extending cutting channels on an outer perimeter of the wheel. The cutting operation can be carried out by cutting the fibers between adjacent clips.

The cutting operation can be carried out by extending a cutting member into the cutting channel to cut the fibers to form the fiber balls.

The clipping operation can be carried out to apply clips between about every 1-5 inches along a stretched length of the fiber bundle.

The method can form between about 40-200 fiber balls per minute.

The method can include automatically indexing the wheel with the clipped bundles of fibers to successively start and stop at least about three times per revolution of the wheel.

The method can include automatically indexing the wheel with the clipped bundles of fibers to successively start and stop a number of times per revolution of the wheel. The cutting operation can be carried out to repetitively extend a cutting member toward the wheel each time the wheel is stopped.

Other embodiments are directed to methods of making fiber balls that include: (a) pulling first and second bundles of elongate fibers in tension past respective first and second automated clippers; then (b) automatically serially applying clips to the first and second bundles of fibers substantially in concert with respective first and second automated clippers; then (c) pulling the first and second bundles of fibers onto respective first and second rotatable wheels so that the first and second bundles of fibers are stretched; (d) indexing the wheels to stop and advance a plurality of times substantially in concert per revolution of the wheels; and (e) automatically serially cutting segments of the first and second clipped bundle of fibers while held on the respective first and second wheels to release clipped segments and form fiber balls.

Still other embodiments are directed to computer program products for controlling a fiber structure-forming apparatus comprising at least one automated clipper, at least one rotating wheel and at least one cutting member. The computer program product can include a non-transitory computer readable storage medium having computer readable program code embodied in the medium. The computer-readable program code can include: (a) computer readable program code configured to index a respective rotating wheel adapted to hold a length of bundles of fibers having spaced apart clips thereon so as to start and stop a plurality of times per revolution of the wheel; and (b) computer readable program code configured to synchronize a clipping operation of the at least one automated clipper with (i) a cutting operation associated with a cutting member and (ii) a stop interval of the wheel.

Yet other aspects are directed to water treatment devices that include a ball structure consisting essentially of a plurality of elongate fibers having at least one metallic or polymeric clip snugly attached to a medial segment of the fibers, thereby holding the medial segment in a tight crimp while ends of the fibers are free.

The fibers can be sorptive waste-water treatment fibers. The ball-like structures can have width, height and depth dimensions that are substantially the same with a size that is between about 2-4 inches.

Other embodiments are directed to apparatus for forming fiber balls. The apparatus include a plurality of clippers; a plurality of rotating wheels held on a common shaft, at least one wheel in cooperating alignment with a respective clipper configured to rotate and releasably engage lengths of fibers; a drive system in communication with the shaft holding the wheels configured to index the wheels to stop and advance a plurality of times per revolution; and at least one cutting mechanism in cooperating alignment with the wheels.

The wheels can be closely spaced apart a distance of between 1-10 inches and have a horizontal axis of rotation defined by the shaft.

The apparatus can include a table with a top surface that holds the drive shaft and the clippers. The table top surface includes apertures or gap spaces that allow a lower portion of each wheel to reside under the table top surface.

The at least one cutting mechanism can be a single cutting mechanism that resides under the table top surface and is configured to cut through fibers held on each wheel in a forward direction, then stop and travel in a reverse direction, to cut through fibers held on each wheel at a next indexed stop.

The cutting mechanism may include: (a) a motor assembly having a motor held under a table that holds the clippers; (b) a pulley in communication with the motor; (c) a bracket holding the motor assembly under the table, the bracket having an upwardly extending arm that holds a cutting blade or knife at an upper portion thereof; and (d) an actuation cylinder with a rod that resides under the table, the rod attached to the motor assembly to cause the arm with the cutting blade or knife to pivot between two spaced apart stop positions, one stop position residing outside each wheel.

The drive system can include an electric motor with a gearbox that drives the shaft holding the first and second wheels so that the wheels rotate to index in concert.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 19A is a side perspective view of a cutting mechanism according to embodiments of the present invention.

FIG. 19B is an exploded view of the assembly shown in FIG. 19A.

FIGS. 19E and 19F are enlarged views of the cutting mechanism shown in FIGS. 19C and 19D, looking toward the wheels, and showing the two different stop positions, on left and right sides of the wheels according to embodiments of the present invention.

FIG. 20A is a side perspective view of a tension guide member according to embodiments of the present invention.

FIG. 20B is an exploded view of the device shown in FIG. 20A.

DETAILED DESCRIPTION

Figure 1:
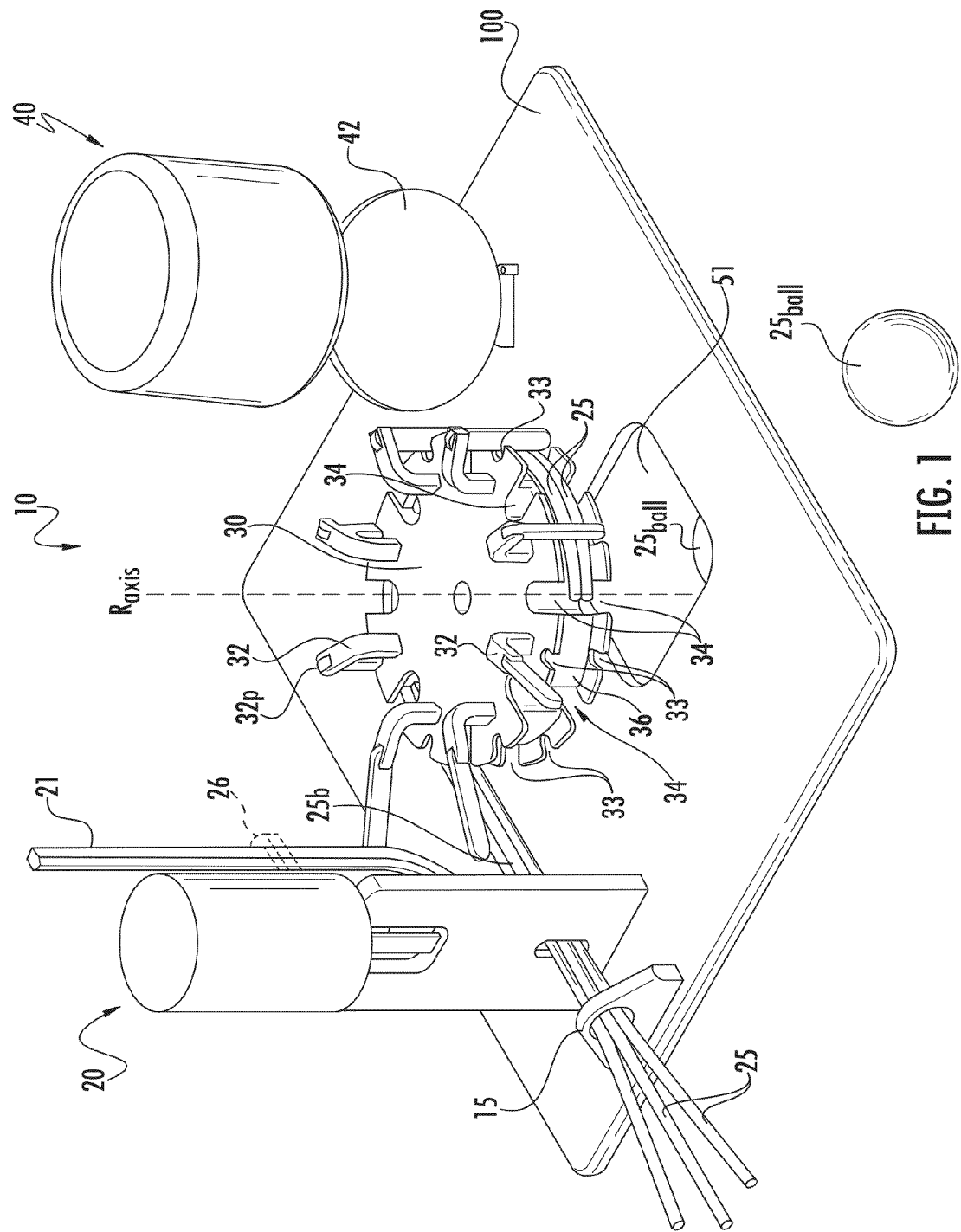
FIG. 1 is a top, side perspective view of a fiber ball formation apparatus according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the claims unless specifically indicated otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. Like numbers refer to like elements throughout. In the figures, the thickness of certain lines, layers, components, elements or features may be exaggerated for clarity. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

The term "about" with respect to a number includes numbers within +/−20 percent of the recited number or range.

The term "consisting essentially of" refers to structures that have only elongate bundles of fibers and one or more crimped clips thereon with no heat or ultrasonic fused center core.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when a feature, such as a layer, region or substrate, is referred to as being "on" another feature or element, it can be directly on the other element or intervening elements may also be present. In contrast, when an element is referred to as being "directly on" another feature or element, there are no intervening elements present. It will also be understood that, when a feature or element is referred to as being "connected" or "coupled" to another feature or element, it can be directly connected to the other element or intervening elements may be present. In contrast, when a feature or element is referred to as being "directly connected" or "directly coupled" to another element, there are no intervening elements present. Although described or shown with respect to one embodiment, the features so described or shown can apply to other embodiments.

The terms "circuit" and "module" refer to entirely software embodiments or embodiments combining software and hardware aspects, features and/or components, including, for example, at least one processor and software associated therewith, embedded therein and/or executable by and/or one or more Application Specific Integrated Circuits (ASICs), for programmatically directing and/or performing certain described actions, operations or method steps. The circuit(s) or module(s) can reside in one location or multiple locations, it may be integrated into one component or may be distributed, e.g., it may reside entirely in a workstation or single computer, partially in one workstation, cabinet, or computer, or totally in a remote location away from a local display at a workstation.

In the description of the present invention that follows, certain terms are employed to refer to the positional relationship of certain structures relative to other structures. As used herein, the term "front" or "forward" and derivatives thereof refer to the general or primary direction that the filler or product travels in a production line to form an encased product; this term is intended to be synonymous with the term "downstream," which is often used in manufacturing or material flow environments to indicate that certain material traveling or being acted upon is farther along in that process than other material. Conversely, the terms "rearward" and "upstream" and derivatives thereof refer to the directions opposite, respectively, the forward and downstream directions.

The term "concurrently" means that the operations are carried out substantially simultaneously. The term "index" and derivatives thereof refers to controlled stop and start intervals per revolution of a wheel. The term "ball" refers to a ball-like structure (at least when dry) having a symmetrical or asymmetrical shape, and can have a substantially spherical shape.

The term "frame" means a generally skeletal structure used to support one or more assemblies, modules and/or components. The frame can be a floor mount frame, a ceiling mount frame, or wall mount frame. The term "automated" means that operations can be carried out substantially without manual assistance. The term semi-automatic means that operator input or assistance may be used but that most operations are carried out automatically using electromechanical devices and programmatically directed control systems.

FIGS. 1 and 3-6 illustrate a fiber ball forming apparatus 10 with a clipper 20 that is in communication with a rotating wheel 30. A plurality of elongate fibers 25 are introduced into to the clipper 20 to be clipped together as bundles of fibers 25b at defined spaced apart locations 25c. A length of a plurality of clipped segments of fibers are taken up by the wheel 30. The apparatus 10 can also include a cutting mechanism 40 with a sharp cutting member 42, such as a blade, knife, laser, or other device. The wheel 30 can releasably hold the fiber bundles 25d downstream of the clipper 20 and rotate to, typically serially, present different adjacent segments 25s to the cutting mechanism 40 to separate, e.g., cut a target segment, of clipped fibers 25c between adjacent clips 26. This positions the clip or clips 26 of a particular segment 25s at a medial lengthwise location of the cut fiber segment. In the embodiment shown, the cutting mechanism 40 is configured to automatically move the cutting member 42 in toward the wheel 30 to cut or otherwise separate a segment 25s of the clipped fibers 25.

Figure 4:
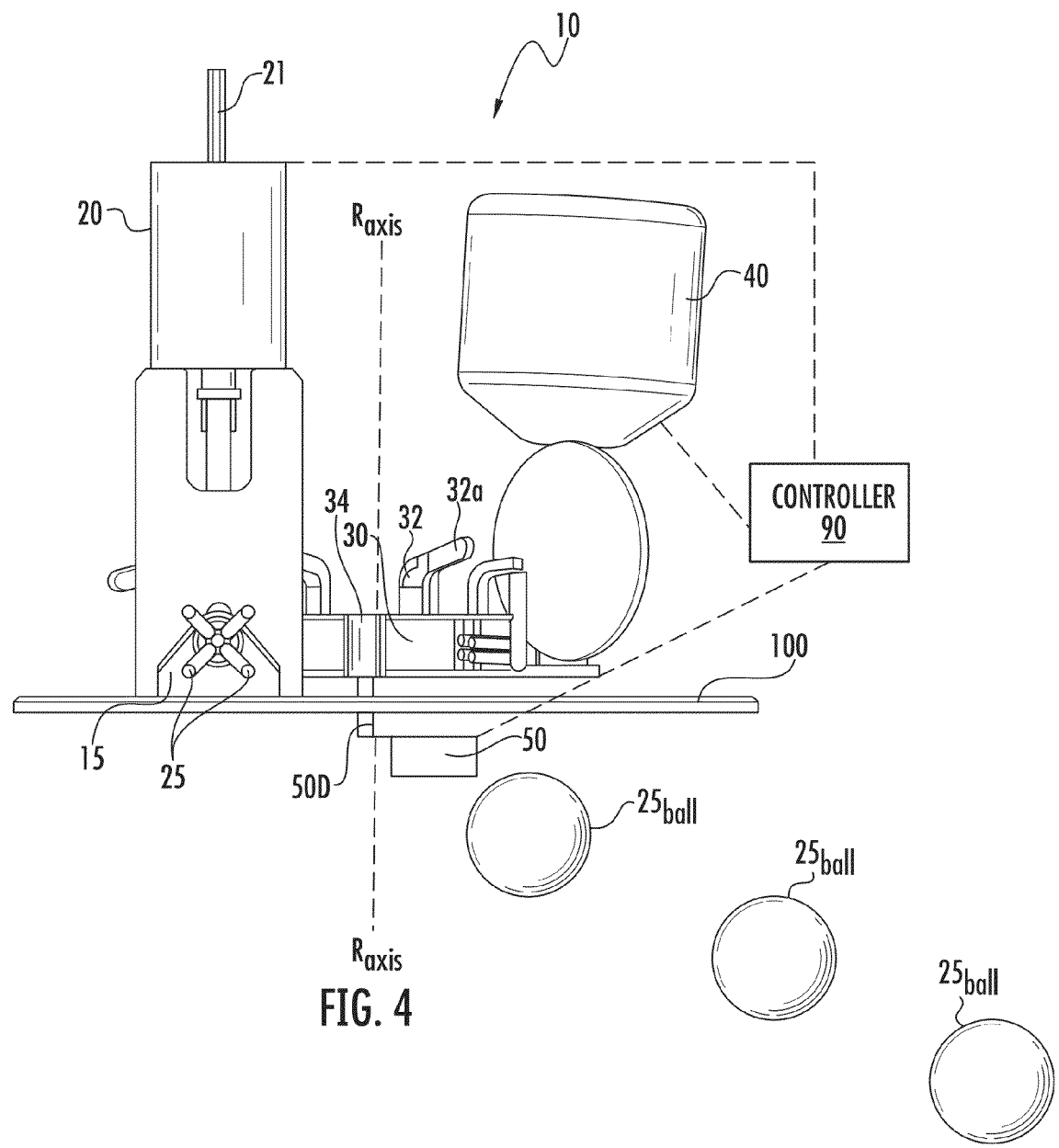
FIG. 4 is a side view of the device shown in FIGS. 1 and 3.

As shown in FIG. 4, the apparatus 10 can include a motor 50 (such as, for example one or more electric motors which may comprise servo motors) that drives the drive shaft 50d attached to the wheel 30 to drive the wheel in a desired motion and/or speed. The drive system can include one or more of gears, linkages, belts, chains, sprockets or the like.

The wheel 30 can continuously rotate at a constant speed as it moves through a revolution or can rotate between slower and fast speeds commensurate with a length of the fibers being fed into the wheel 30. However, in some preferred embodiments, the wheel 30 is indexed to rotate a defined distance (a defined angular rotation, then stop, then rotate, then stop) as it rotates through at least one revolution. That is, the wheel 30 typically stops for a short duration, then moves a defined distance at least about 3 times per revolution (depending on the size of the wheel used and the space between clips 26), typically between about 8-35 times, more typically between about 8-20 times, such as about 8 times or about 12 times. The indexed movement can be synchronized so that the stop interval is during an active clip operation by the clipper 20 to apply one or more clips serially to different segments of the fiber bundle 25.

The synchronization of the clipper 2Q with the indexed movement of the wheel 30 can be based on time and/or sensor input from appropriately placed electrical or optical sensors.

In addition, the cutting member 40 can be synchronized to cut between adjacent clip segments $25s_1$, $25s_2$ during a respective stop interval. The cutting can be carried out so that the clip resides in a medial or substantially central portion of a respective cut segment. In other embodiments, the clip can reside closer to one side of a clipped, cut segment.

As also shown in FIG. 1, the apparatus 10 can also include at least one guide member 15 that slidably encases a plurality of fibers 25 upstream of the clipper 20 so that the fibers are gathered and aligned with a clip window as they approach the clipper 20.

Figure 2:
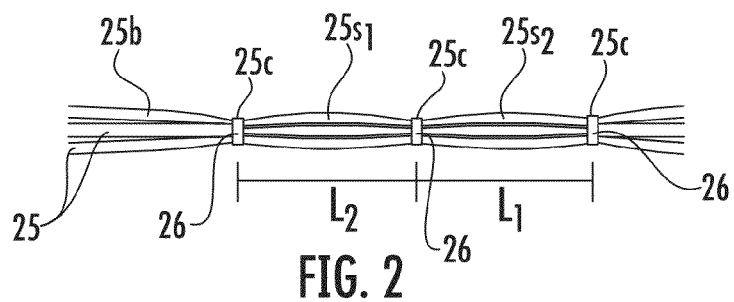
FIG. 2 is a schematic illustration of a length of clipped fibers according to embodiments of the present invention.
Figure 3:
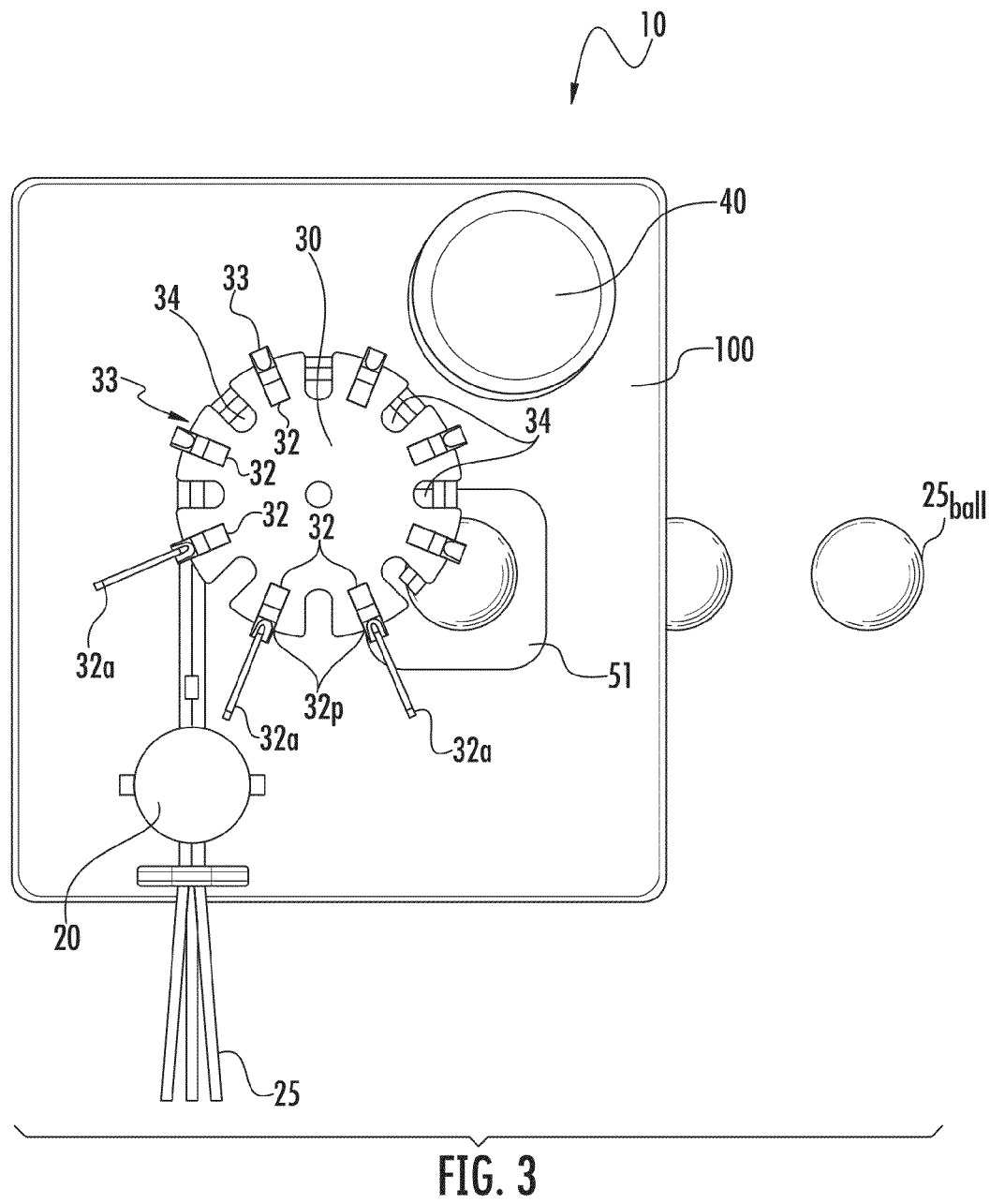
FIG. 3 is a top view of the device shown in FIG. 1.

FIG. 2 illustrates the bundles of fibers 25b (without the apparatus 10) that are clipped using one or two closely spaced clips 26 at regular or irregularly spaced lengths for one or more segments $25s_1$, $25s_2$ so that one (or more) clips 26 associated with a respective segment 25s are spaced apart a length L1 and/or L2 that is between about 0.10 inches to about 10 inches apart, typically between about 0.5 inches to about 5 inches, and more typically between about 2.5 inches to about 4 inches such as about 3.5 inches or about 3 inches. The length L1 of one segment 25s may be the same or different than the length L2 of an adjacent segment 25s.

On the wheel 30, the fibers 25 can be held stretched and a respective fiber ball can be formed from a stretched length of a bundle of fibers 25b between about 1-10 inches, typically between about 2-5 inches, and in some embodiments, about 3 inches, with a clip or clips 26 in a middle segment thereof.

Figure 8:
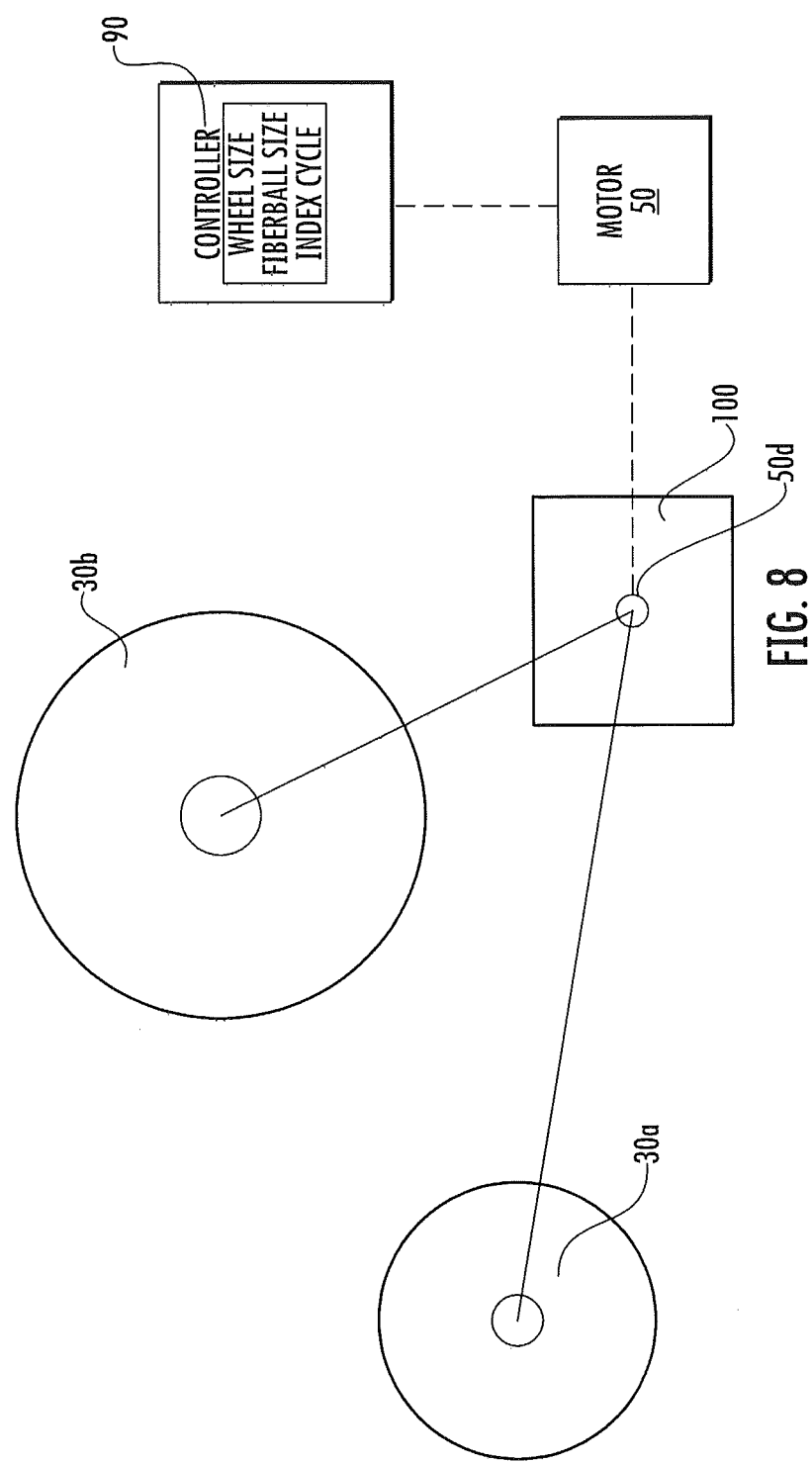
FIG. 8 is a schematic illustration of a fiber ball formation apparatus according to some embodiments of the present invention.

The fibers 25 can be provided as individual spools or other lengths of fibers or may be pre-bundled into a spool 125 (FIG. 5) of pre-bundled (long lengths of substantially parallel) fibers. To start production using a new batch of fibers, an end portion thereof can be pulled through a clip path of the clipper and threaded onto the wheel 30, then the clipper 20 and wheel 30 (and cutting mechanism 40) can operate automatically using a controller 90 (FIG. 8). It is also noted that the clipper 20 is not required to be located on the same support member 100 as the cutting member 40 or wheel 30 but can be spaced apart a distance and held by another support member. In other embodiments, the lengths of fibers can be pre-clipped and provided to the wheel in pre-clipped lengths, held under tension, drawn and cut to form the fiber balls.

In some embodiments, the apparatus 10 (and 10', FIG. 11) can be configured to produce between about 40-1,000 fiber balls per minute, typically 50-300, and more typically 40-200, such as, for example, about 40, about 50, about 60, about 70, about 80, about 90, about 100, about 120, about 130, about 140, about 150 or more.

Figure 16:
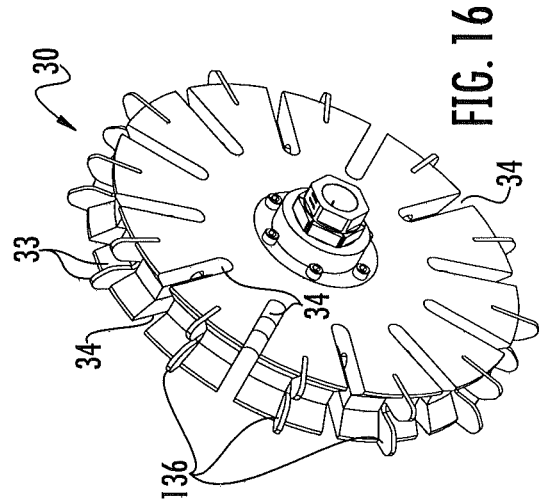
FIG. 16 is a side perspective view of an exemplary wheel suitable for use in the fiber forming apparatus according to embodiments of the present invention.

The wheel 30 can, in some embodiments, include a plurality of spaced apart holding members 32 that have arms 32a that are electronically directed to pivot outward via pivot 32p to release respective segments of clipped fibers 25s and pivot down to close against an underlying portion of fibers 25. The number of indexed stops per revolution can be the same as the number of holding members 32, e.g., eight as shown in FIG. 1, or 12 as shown in FIG. 16, but lesser or greater numbers can be used.

The clipper 20, wheel 30 and cutting mechanism 40 can be held by a support member 100, such as a platform or frame. The support member 100 can be configured as a substantially planar plate or table. The support member 100 can include a discharge window 51 that resides under the wheel 30 to allow the cut fiber balls 25ba11 to fall into a collection bin, conveyor or other collection device or container. Pressurized fluid (e.g., blower air) or pushers can also be used to direct the released fiber balls to a desired collection area.

The wheel 30 can include a plurality of shallow channels 33 for holding a respective clipped location (the clip 26) of an associated clipped segment of the fibers 25c. The wheel 30 can include a deeper cutting channel 34 intermediate adjacent shallow channels 33. The deeper channel 34 can be configured to allow the cutting member 42 to move in to cut the clipped segment of fibers 25c between clips 26 of respective segments 25s, then to move back out to a home position in quick successive fashion as the wheel 30 rotates.

When closed, the pivot arm 32a can enter a shallow receiving channel 33 to hold the fibers against a circumferentially extending outer surface 36 of the wheel. Once the pivot arm 32a opens, downstream of the cutting member 40, typically over window 51 (at least for the wheel orientation shown in FIG. 1), the cut segment releases as a fiber ball 25ba11.

In other embodiments, other holding members 32 can be used, including, for example, clamps or rods that are mounted to the support member 100 rather than the wheel 30, clamp members that trap or pin the fibers down against a support surface, holding members 32 that move up and down or side-to-side rather than pivoting up and outward, or static outwardly extending members such as tapered forks 136 (FIG. 16) or guides, and the like.

As noted above, in some embodiments, the cutting member 42 can move in to cut adjacent segments apart when the wheel 30 stops during a clip operation. The shallow channel can hold clips 26 of the clipped fibers 25c or the clips may reside proximate the shallow channel 33 (FIG. 18C) while unclipped portions of the fibers extend over the deeper cutting channel 34. The fibers 25 can be held against a planar surface 36 or a curved surface (not shown). The shallow and deeper channels 33, 34, respectively, can alternate about the circumference of the wheel 30. In some embodiments, the wheel 30 does not require either channel or may use only the cutting channel 34, for example. As shown, the cutting mechanism 40 comprises a rotating blade or knife as the cutting member 42 that enters the channel 34 and cuts in a direction that is substantially orthogonal to the longitudinal direction of the clipped fibers 25c on the wheel 30.

Figure 7:
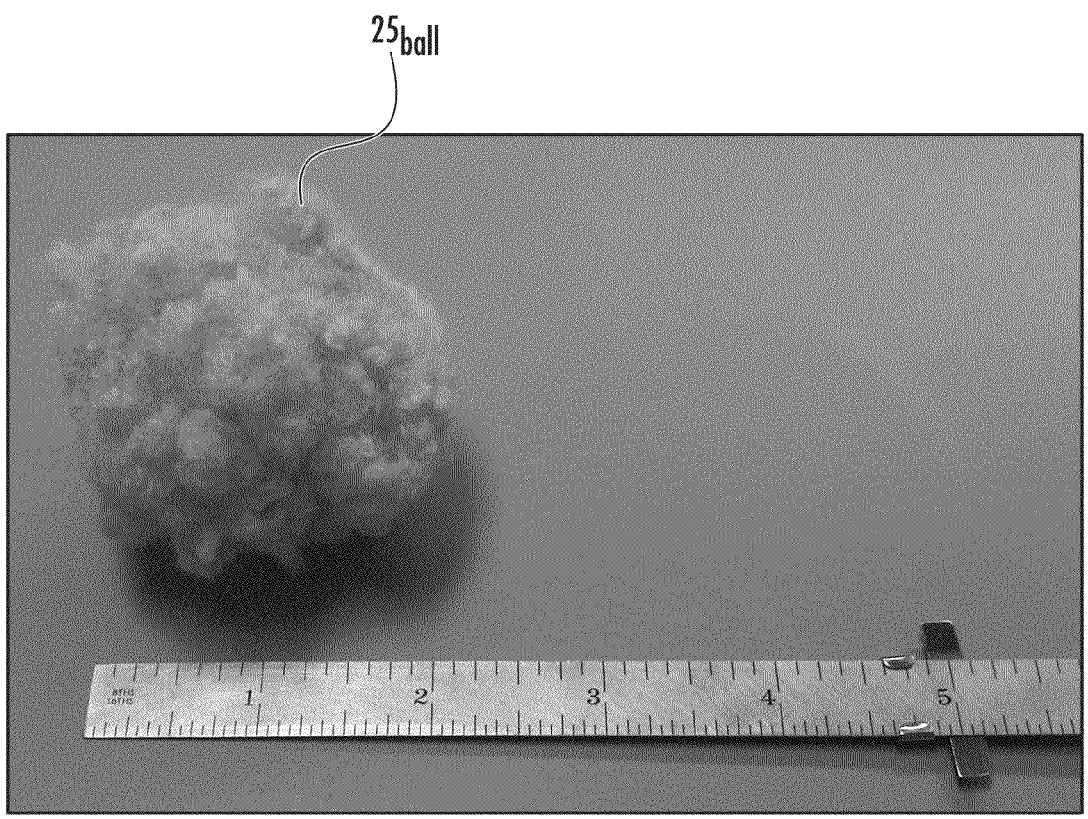
FIG. 7 is an enlarged view of a fiber ball according to some embodiments of the present invention.

The fibers 25 of each fiber ball 25ba11 are held together by a tightly formed clip(s) 26 that snugly encases a gathered or compressed perimeter of a portion of the bundled fibers and resides medially in a respective fiber ball 25ba11 while the ends of the fibers are loose and can expand to form a ball-like shape as shown, for example, in FIG. 7.

The fiber balls 25ba11 can have any suitable size, but is typically between about 1 inch to about 10 inches in diameter, more typically between about 1-5 inches, and yet more typically between about 2-4 inches such as about 2 inches (unstretched, dry, on average). The fiber balls 25ba11 can have a diameter, such as about 1 inch, about 1.5 inches, about 2 inches, or about 2.5 inches, about 3 inches, about 3.5 inches, about 4 inches, about 4.5 inches, about 5 inches, about 5.5 inches diameter (average, dry) or even greater. The wheel 30 can be sized according to the size of the balls 25ba11 so that the wheel 30, at any one time, can hold sufficient lengths of stretched bundles of fibers to form a plurality of fiber balls.

The apparatus 10 can be configured to apply a substantially constant tension to the fibers 25 as they are pulled through the clipper 20 and held on the wheel 30 until released after successive ends are cut at the cutting mechanism 40. The guide member 15 and/or a braking member 126 (FIG. 5) residing upstream of the clipper 20 can be configured to hold the fibers at a desired tension T.

Once cut loose, the segments 25s are free from the forming tension and the fibers 25 can spring back a distance so that the fiber ball 25b diameter is at least about 10% less, typically at least 20% less, than a length between successive clips applied to the fibers 25 when a corresponding length is held by the wheel 30. Thus, for example, while the clips 26 can be applied by the clipper 20 at defined, typically substantially constant distances, such as, for example, about every three inches of fibers (typically held stretched), the clips can be applied at different spaced apart lengths, such as alternating shorter and longer lengths or irregularly spaced apart lengths, for example.

Figure 5:
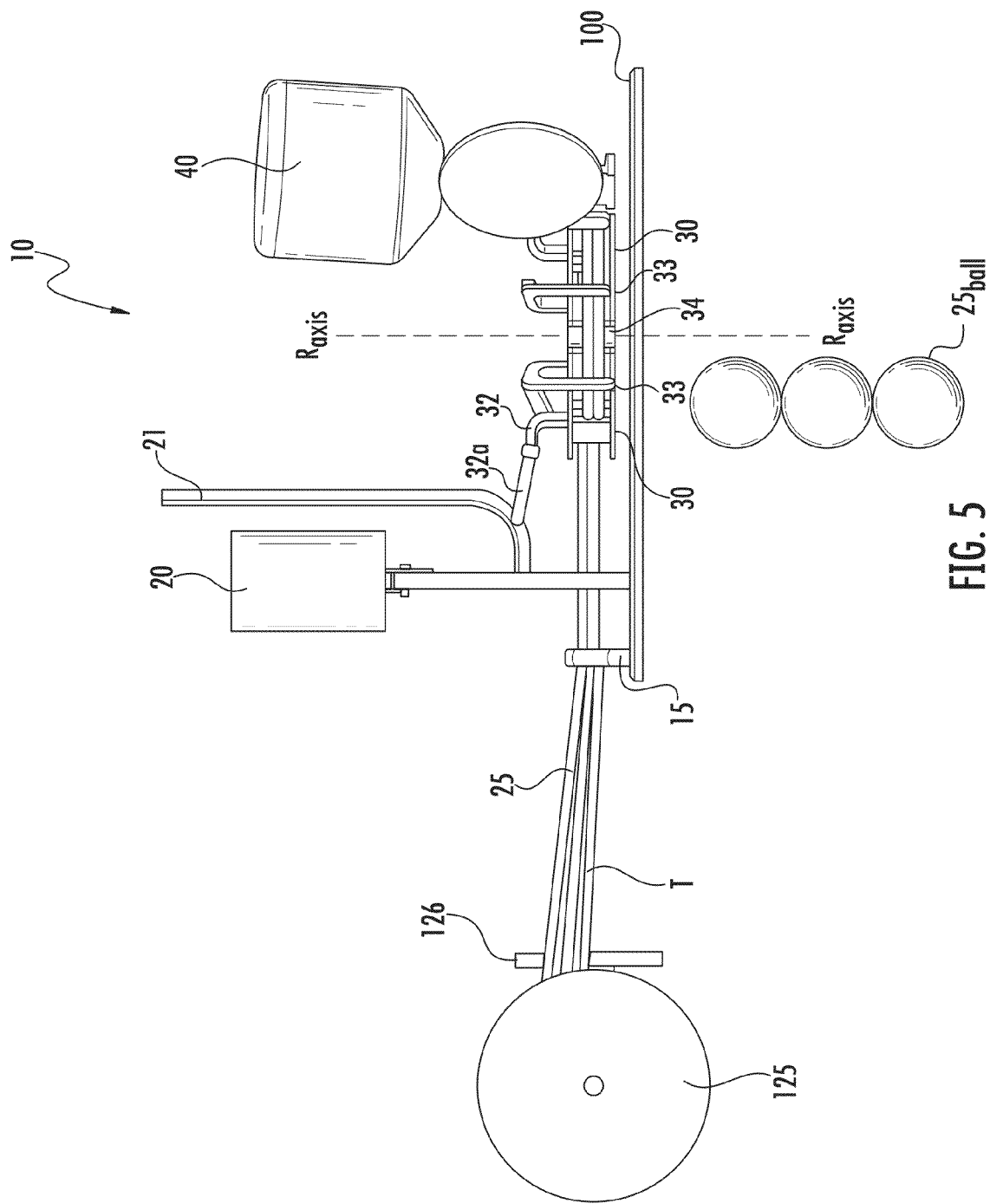
FIG. 5 is front view of the device shown in FIG. 1.
Figure 6:
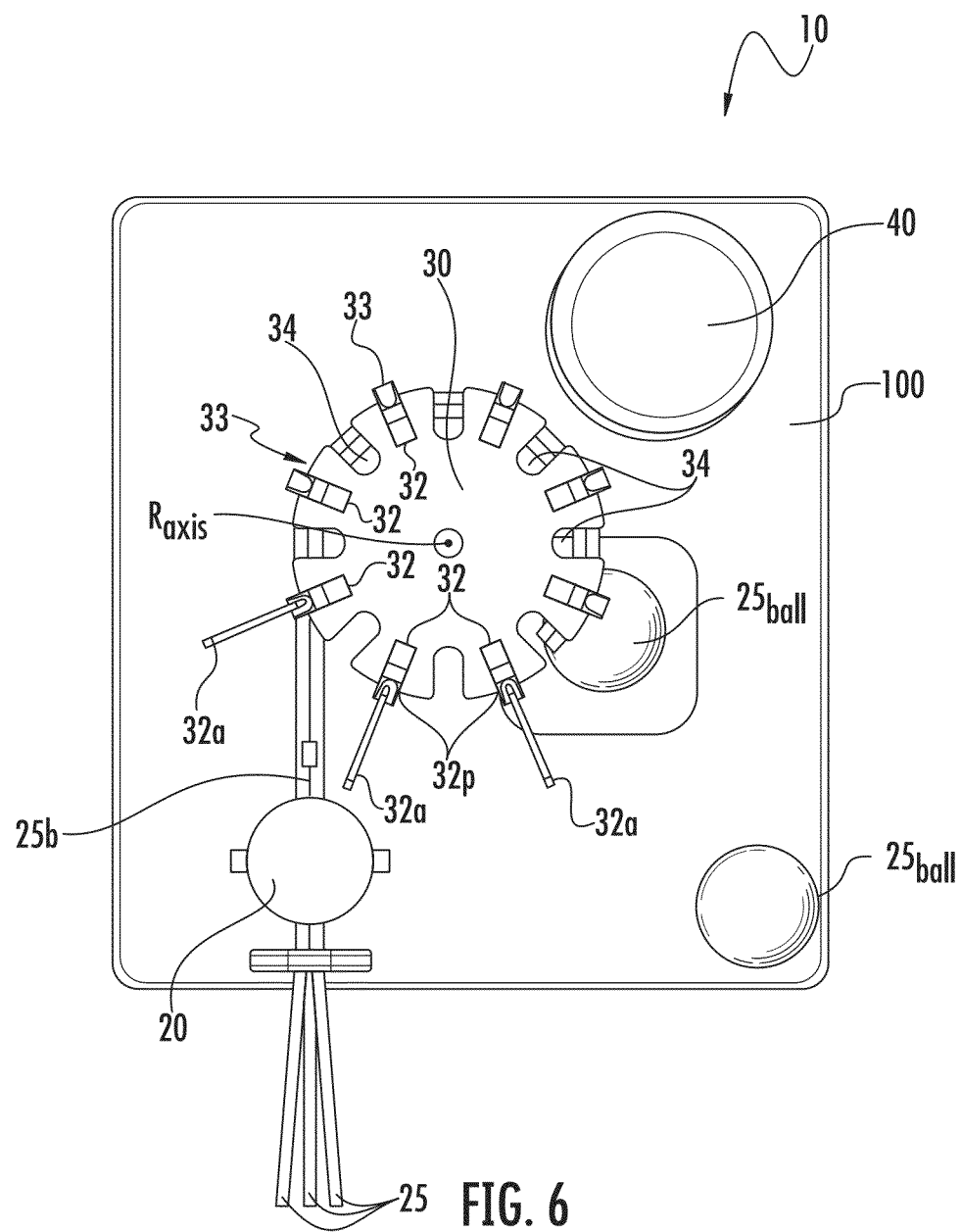
FIG. 6 is side view of the device shown in FIG. 1 illustrating a different orientation of the device according to embodiments of the present invention.

The apparatus 10 can be oriented with the wheels oriented to operate vertically rather than horizontally or even at an angle between horizontal and vertical. Also, the wheel 30 and/or clip window of the clipper 20 can be under the support member 100. The clipper 20 can be upright and the rotating wheel 30 can rotate about an axis of rotation Raxis that is substantially vertical as shown in FIGS. 1 and 5, for example. However, other orientations of the clipper 20 and wheel 30 can be used. For example, the wheel 30 can be oriented to be upright to rotate so that the Raxis is horizontal as shown in FIG. 6 (the Raxis is horizontal and extends out of the paper in the Z-axis direction) and FIGS. 11-15, or even at an angle between horizontal and vertical.

The clips 26 and clip rail 21 can be fed to the clipper above the support member 100 or below or to the side (depending on the clipper orientation). The clipper 20 can apply the clip above or below the support member 100 or to one side or the other if the clipper 20 is oriented to clip in a Z- or X-axis direction, rather than in the Y-axis direction shown.

To facilitate increased production rates, more than one clipper 20 and/or more than one wheel 30 may be used, typically in a common housing 10h. Thus, for example, the device 10 can include a second clipper and either a second wheel 30, that may optionally spin or rotate in the opposite direction of the first wheel. The device 10 can include two feeds or inputs of fiber bundles, two clippers, two wheels, and two cutting mechanisms 40 that can be spatially separate as double the components in the device shown in FIG. 1. In some embodiments, a double-decker wheel can be used where first and second sets of bundled fibers can be held around the same wheel but spaced apart. In this embodiment, the same cutting member 40 can be used to substantially concurrently cut both sets of bundled fibers. In some embodiments, more than two clippers can be used with corresponding fiber sets, each with a separate wheel 30 or each feeding into a common wheel, such as, for example, three clippers with three fiber sets and a triple-deck wheel or four clippers with four fiber sets and a quad-deck wheel configuration.

The fibers 25 are typically all of the same size and type material. However, different size fibers 25 and/or fibers 25 comprising different materials may be bundled for the fiber balls. No center core of a different material of a fusible fiber is required. The fibers 25 can be any suitable material. The fibers can be provided as long lengths of tow. Tow is an untwisted bundle of continuous filaments or fibers, and it refers to synthetic (man-made) or natural filaments or fibers. The fibers 25 are configured to be absorptive and/or filter target materials in a water treatment system. The fibers 25 (or multi-fiber strands) can be between about 0.001 inches to about 1 inches in width and/or height (in cross-section) but other sizes and are typically between about. In some embodiments, the fibers 25 (or multi-fiber strands) can have a fiber diameter of between about 1-1000 denier.

The fibers 25 can have any cross-sectional shape and are not limited to circular cross-sectional shapes. The fibers 25 can comprise twisted or braided yarns or threads. The fibers 25 can comprise untwisted filaments, threads or yarns or straight unbraided threads or yarns. The fibers 25 can comprise combinations of straight, twisted or braided yarns, filaments or threads or other fiber configurations. Any number of fibers can be clipped together to form the respective fiber balls, provided as individual fibers or multi-fiber strands of fibers, typically between about 2-10,000. For example, the fibers 25 can be provided as a plurality of multi-fiber strands, such as between about three strands to about 100 strands, including about four strands, about five strands, about six strands, about seven strands, about eight strands, about nine strands, about ten strands or even more strands. In some particular embodiments, the fiber balls are formed from 5 multi-fiber strands or 5 tows of fibers clipped at about 3 inch distances (average, measured as stretched on the wheel).

The fibers 25 can comprise natural or synthetic materials or combinations of same. The fibers 25 can include, for example, cotton, wool, flax, hemp or jute (or other coarse fiber), sorptive lignocellulosic fiber material and the like or combinations thereof. The term "lignocellulose" means any of several closely related substances constituting the essential part of woody cell walls of plants and consisting of cellulose intimately associated with lignin and hemicellulose. Thus, lignocellulose fibers refers to fibers comprising material isolated from wood or other fibrous plant materials. Examples of sorptive lignocellulosic fiber materials are described in U.S. 2008/0017581, the contents of which are hereby incorporated by reference herein.

The fiber balls $25ba11$ can be particularly suitable as filter media for wastewater treatments, but may find use in other fluid applications such as filter media for fish farms, and filter media for air or gas lines or systems, and waste or spill clean-up and the like. In other embodiments, the fiber balls $25ba11$ can be for other industrial, commercial or recreational uses.

The clipper 20 can be double clipper or a single clipper (the former means that it can apply two clips to two different (spaced apart) target locations typically substantially simultaneously, each of which is well known to those of skill in the art. U.S. Pat. No. 5,495,701 proposes a clip attachment mechanism for fastening a single clip or two clips simultaneously. Examples of double clippers are described in include U.S. Pat. Nos. 4,766,713, 5,495,701 and 7,536,838. Clip attachment apparatus or "clippers" are well known to those of skill in the art and include those available from Tipper Tie, Inc., of Apex, N.C., including product numbers Z3214, Z3202, and Z3200. Other examples of clippers are described in U.S. Pat. Nos. 3,389,533; 3,499,259; 4,683,700; and 5,161, 34. The contents of the patents discussed herein are hereby incorporated by reference as if recited in full herein.

In some embodiments, the clipper 20 can be an electric clipper that does not require pressurized air or hydraulics for operation.

The clipper 20 can be a stationary-mounted clipper or may pivot into position. As shown, the clipper 20 is a stationary-clipper that is affixed to a support platform or frame 100. The clip rail 21 directs clips 26 from a clip spool $20s$ (FIG. 9) to a clip window associated with an automated clip punch.

The punch (not shown) can operate with a punch pressure of between about 40-100 psi, and typically of between about 60-100 psi, such as about 80 psi for some embodiments. The pressure may vary depending on the size of clip and clip material. The clip punch tightly applies the clip 26 about the fiber bundles $25b$ at desired lengths using a clip die as is well known to those of skill in the art. Examples of conventional generally "U" shaped (metal) clips are described in U.S. Pat. Nos. 2,880,419, 3,400,433, 4,525,898, and 4,944,172. However, as noted herein, the clips can be of any suitable material and are not required to be metallic.

Automated or semi-automated clippers can be used to feed the clips along a clip rail 21, then punch the clip through a clip window over and around gathered casing or bag material. The clips 26 can be formed from a material that is chemically inert so that they are safe for use in water treatment systems. The clips 26 can be metallic, e.g., stainless steel, aluminum, titanium or may be non-metallic such as elastomeric, polymeric and the like or the clips may be formed with combinations of metallic and non-metallic materials. The clips may be configured to be absorbed, degrade or otherwise dissolve or disintegrate over time, such as when exposed to fluid over time.

While the clipper 20 is shown as upright and above the support member 100, as noted above, the clipper 10 may be alternatively configured to supply and apply the clips 26 from other orientations, including, but not limited to, from beneath (not shown) the target product with the punch rising from the bottom or moving in from the side.

In some embodiments, the rail 21 is configured to hold a thermoplastic polymer clip having a generally U-shaped body with a tapered inner perimeter profile. In some embodiments, particularly when applying non-metallic clips 26, the clipper 20 can be configured to allow the punch to apply force to the clip 26 by forcibly holding the clip against the die after the clip 26 is attached to the fibers 25 and/or deformed thereabout for a holding period. The holding period can be associated with the punch retraction. The holding period can be between about 0.25-1 second, and is typically about 0.3-0.7 seconds, and is more typically about 0.5 seconds. The term "elastomeric" means that the clip 26 comprises at least one polymer and is sufficiently rigid to define a first self-supporting configuration and sufficiently malleable to deform into a second closed configuration to thereby secure a gathered portion of the target enclosure material. The term "polymer" includes copolymers, polymer blends and derivatives thereof. In some embodiments, the clip 30 can comprise a thermoplastic polymer.

Turning to FIG. 8, the apparatus 10 can includes a controller 90 with a user interface, which can be configured as a Human Machine Interface ("HMI"). The apparatus can include safety locks and overrides, as is well known. The apparatus can include a housing guard as well. In some embodiments, the apparatus 10 can be configured to interchangeably mount different wheels $30a$, $30b$ of different diameters. The controller 90 can be configured to adjust operation based on the wheel in use with the drive shaft $50d$. This can include a different clip punch pressure, wheel speed, wheel index pattern, cutting member extension distance and the like. The different wheels $30a$, $30b$ can produce different sized fiber balls $25ba11$ without requiring a dedicated apparatus for each fiber ball size.

Figure 9:
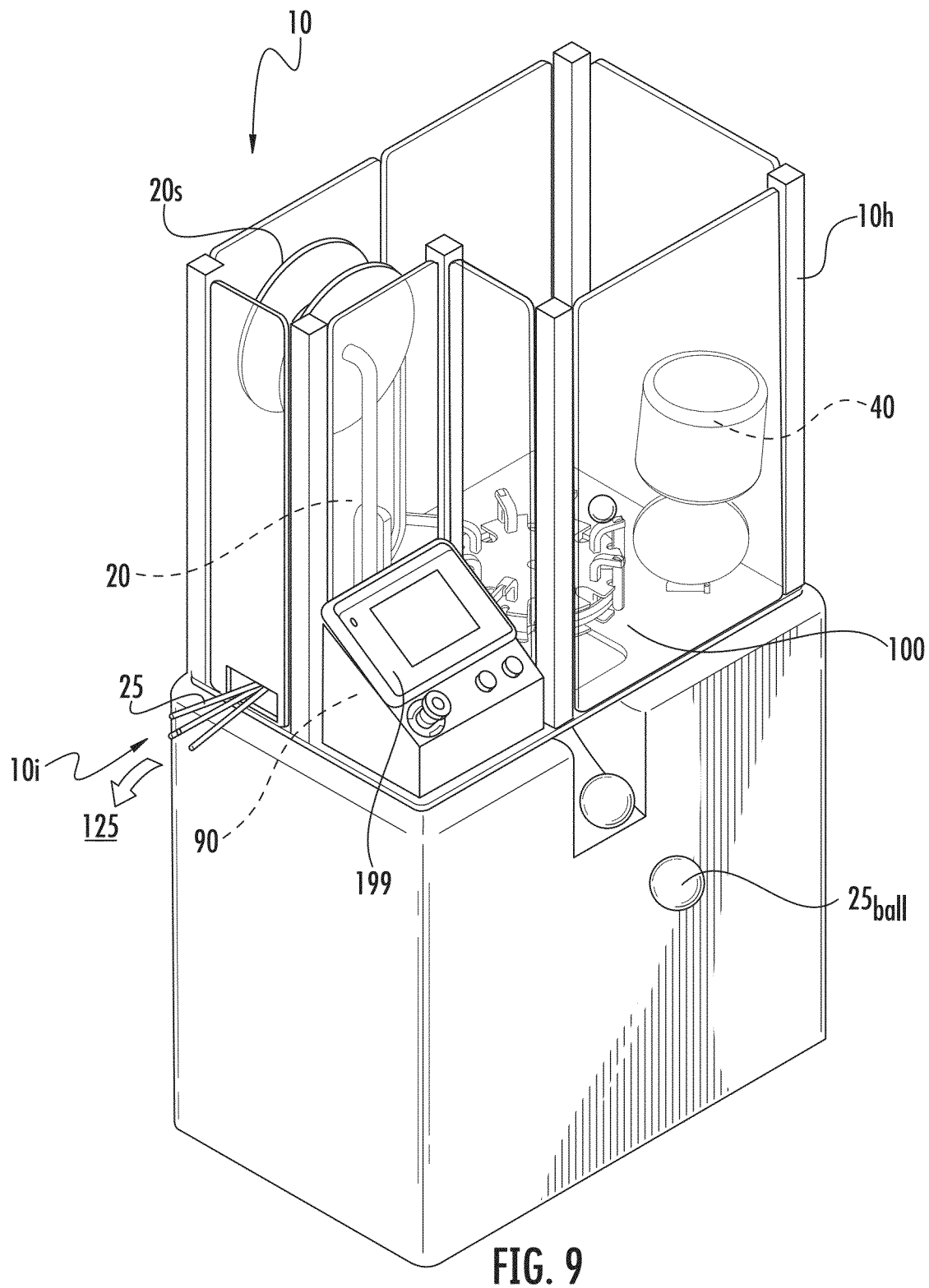
FIG. 9 is a front side perspective view of a device according to some embodiments of the present invention.

FIG. 9 illustrates that the device 10 can include a housing $10h$ that encloses the clipper 20, the cutting mechanism 40, the platform 100, the motor 50 and the wheel 30. The housing $10h$ includes an input window $10i$ for at least one set of fibers 25. The housing $10h$ can also include at least one output window $10o$ for ejecting or otherwise delivering the fiber balls $25ba11$. The device 10 can include a HMI (with the controller 90) with a User Interface 199.

Figure 10A:
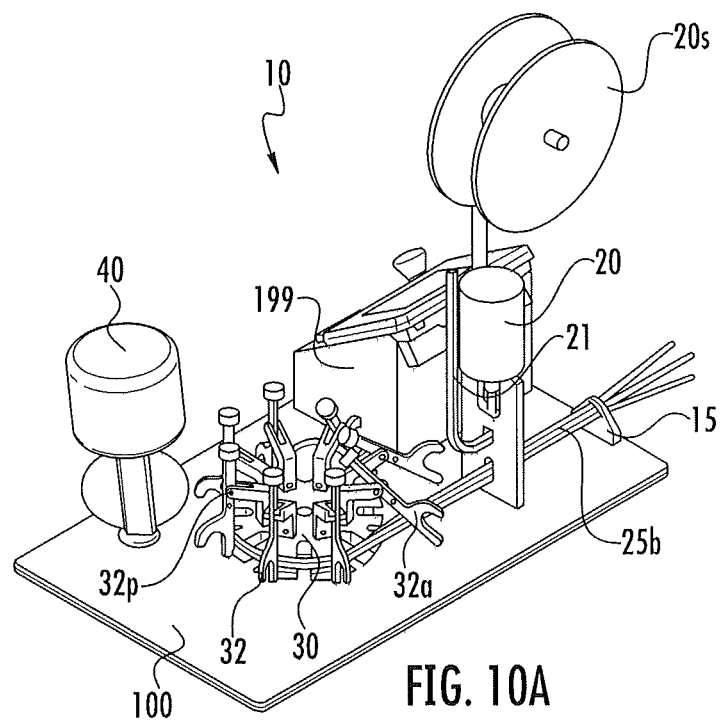
FIGS. 10A and 10B are rear perspective views of components in the device shown in FIG. 9 according to embodiments of the present invention.
Figure 10B:
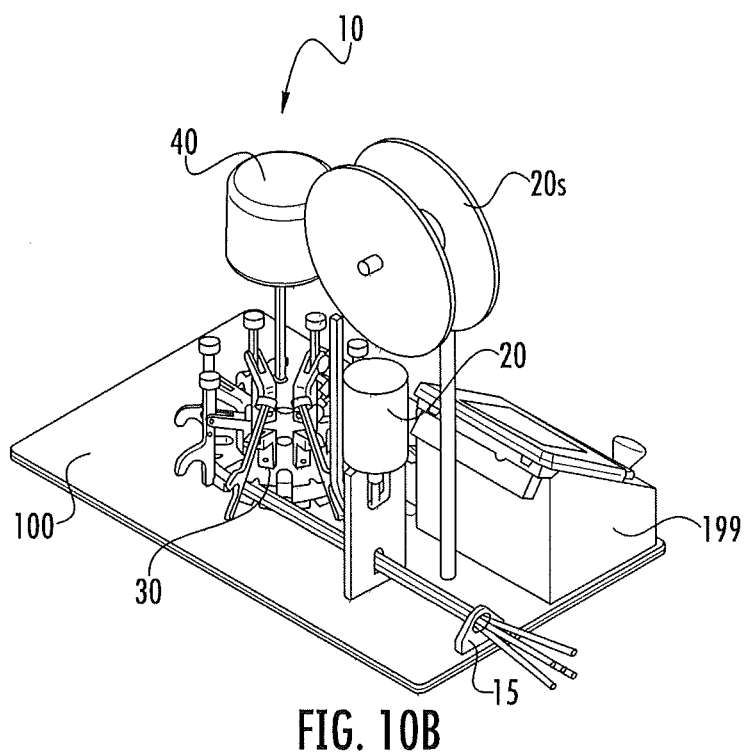

FIGS. 10A and 10B illustrate that the wheel 30 support holding members 32 with arms $32a$ can include a fork-like lower edge with a top that extends a distance above the pivot $32p$.

Figure 11:
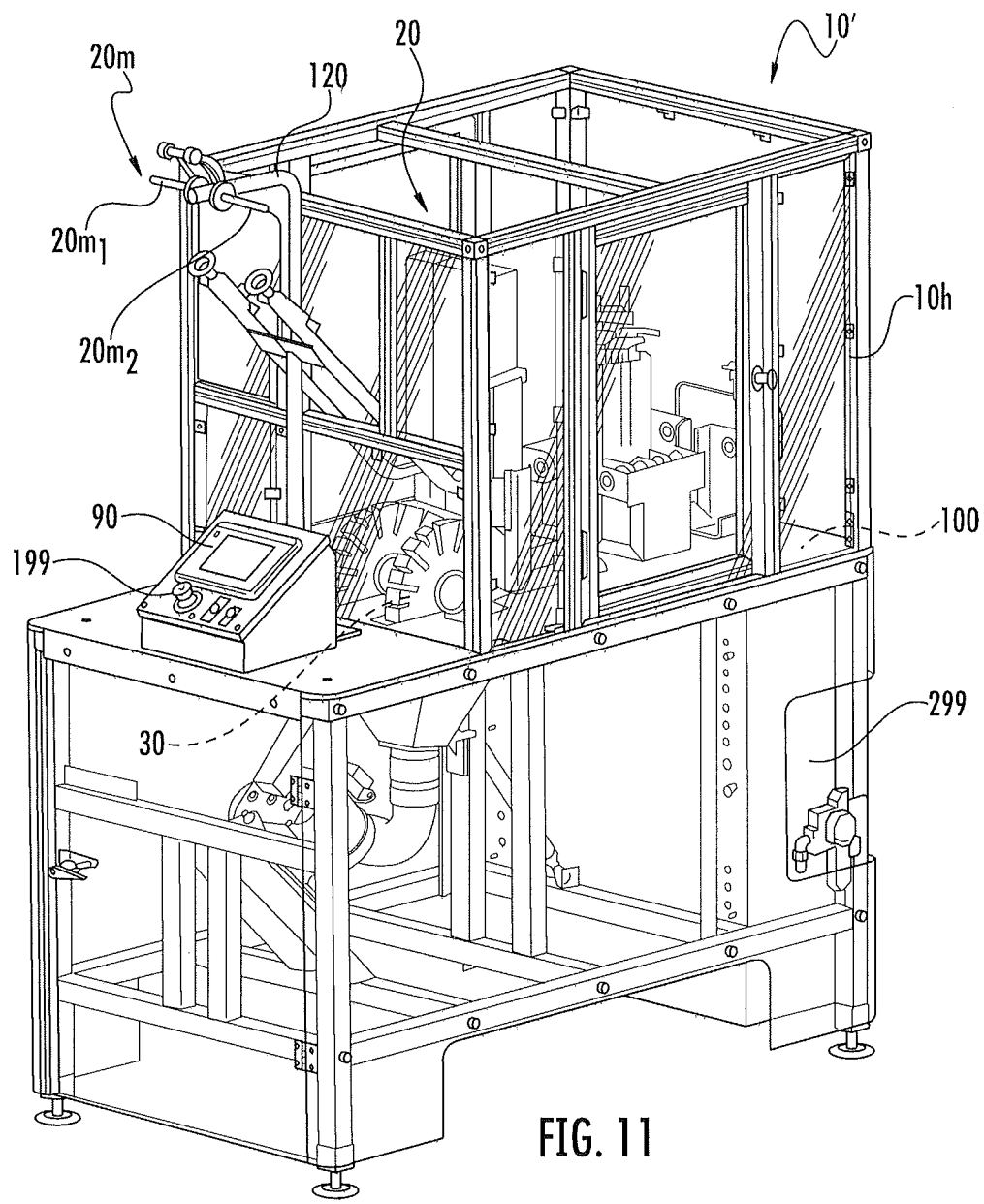
FIG. 11 is a side perspective view (with portions of the housing shown as transparent) of an automated fiber forming apparatus according to embodiments of the present invention.

FIGS. 11-15 illustrate another embodiment of the apparatus 10'. As shown in FIG. 11, in this embodiment, there are a plurality of wheels 30 held inside a common housing $10h$. The skin of the housing $10h$ is shown as being translucent/transparent for visual access to internal components. The apparatus 10' includes a HMI/display 199 and a control box 299 that provides electrical components such as fuses, switches, and the like for different on-board devices such as sensors, actuators, and drive systems. The controller 90 can be held in the HMI 199 or control box 299, distributed therebetween, or held in a different location.

As shown, the apparatus 10' includes a clip stand assembly 120 with two clip spool mounts $20m$, each individual mount labeled as $20m_1$, $20m_2$, for releasably engaging clip spools $20s$. The spool mounts $20m$ can reside outside the housing $10h$ for ease in operator loading (and reloading), but may also be enclosed in the housing $10h$ (not shown). As shown, the clip spool mounts $20m$ reside above the platform 100 and are fed to travel down to the clipper 20. However, in other embodiments, the clip spool mounts $20m$ may reside below the platform and be fed up to the clipper 20.

Figure 12B:
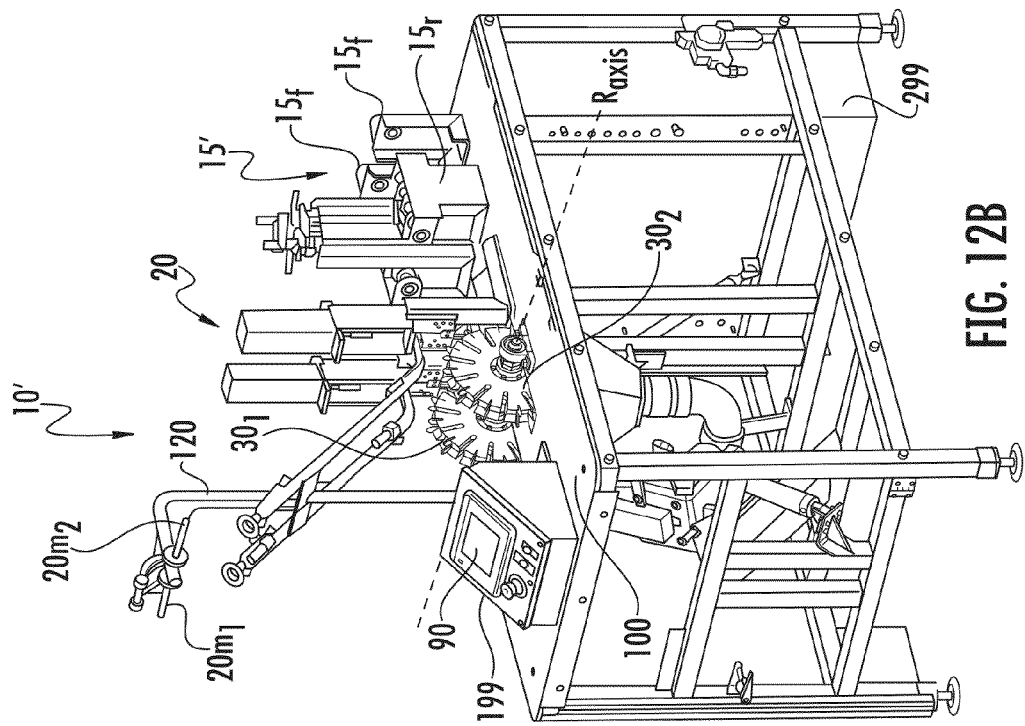
FIG. 12B is an opposing side view of the view shown in FIG. 12A according to embodiments of the present invention.
Figure 12A:
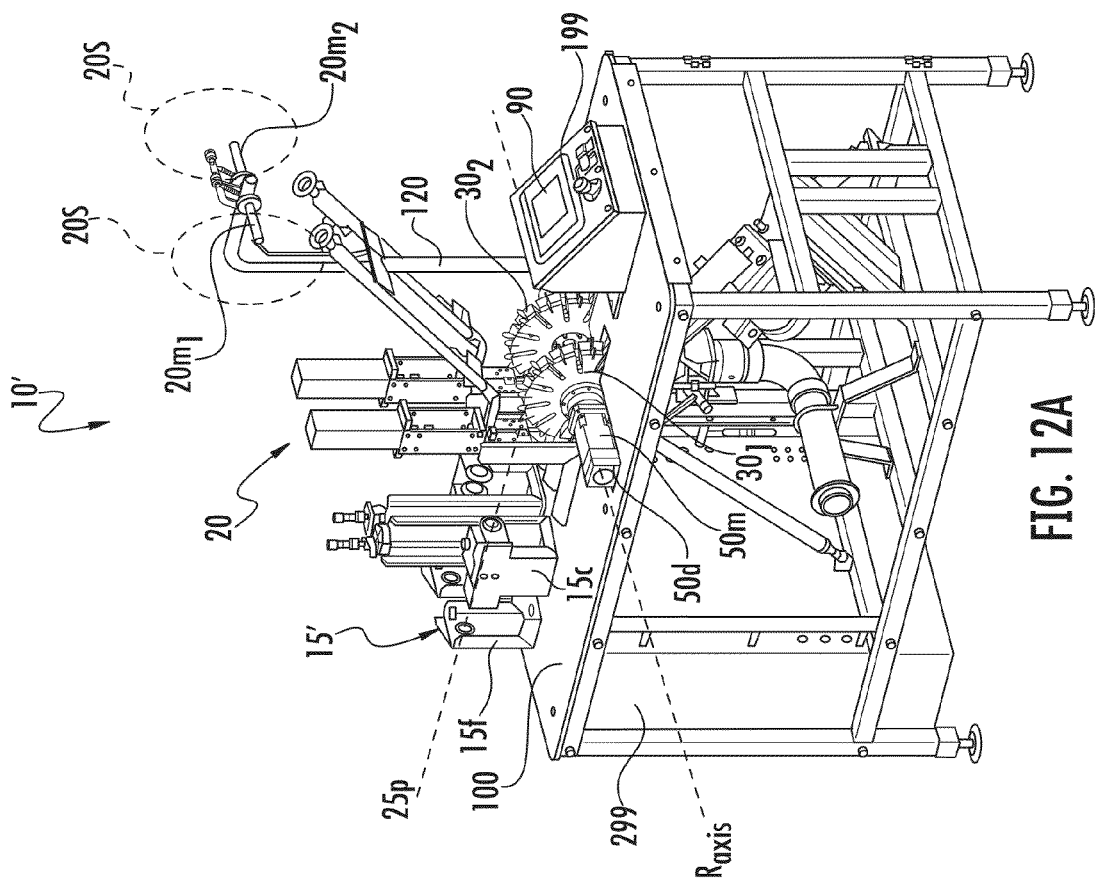
FIG. 12A is a side perspective view of the device shown in FIG. 11, without the housing guards according to embodiments of the present invention.

FIGS. 12A and 12B illustrate two rotatable wheels $30_1$, $30_2$ typically spaced apart between about 2-12 inches, in communication with a clipper 20 (which may be a double clipper). The wheels $30_1$, $30_2$ may be mounted vertically and in-line about a common horizontal axis of rotation Raxis.

It is contemplated that the apparatus 10' can include additional wheels 30 and associated clipper(s) 20. For example, four or more wheels 30, and two or more single or double clippers 20. For double clippers, two wheels 30 can be aligned and cooperate with each respective double clipper 20. The clippers and wheels may be stacked or in line with a common or different axis of rotation (not shown).

Figure 18B:
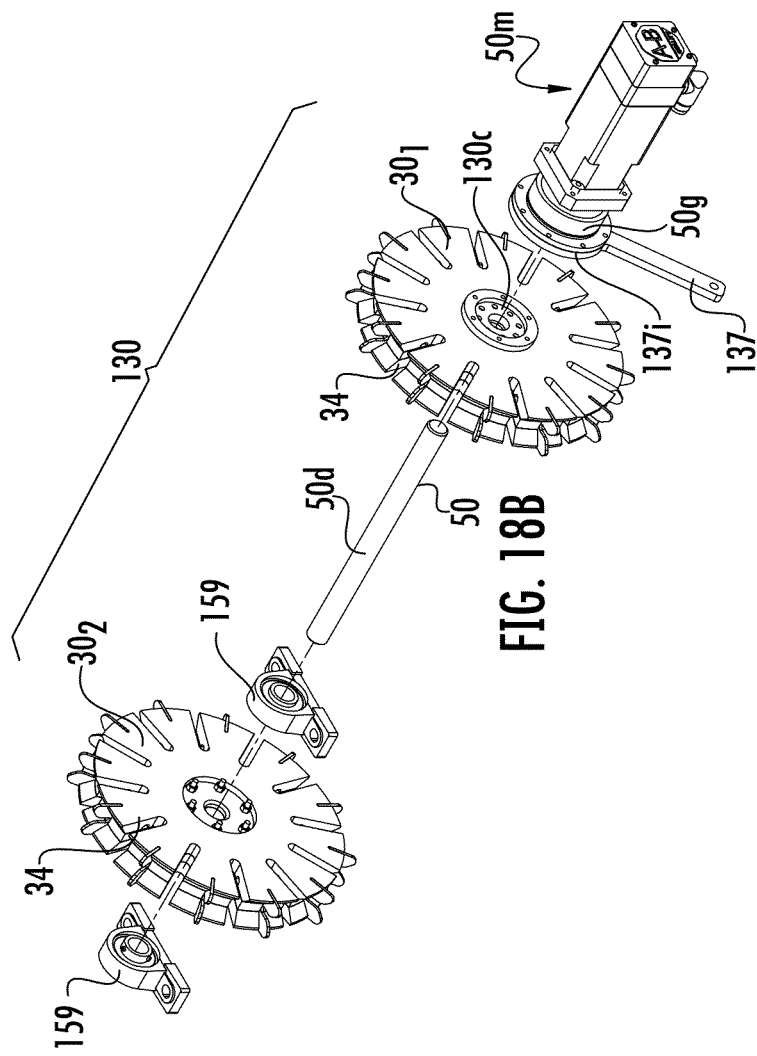
FIG. 18B is an exploded view of the assembly shown in FIG. 18A.
Figure 18A:
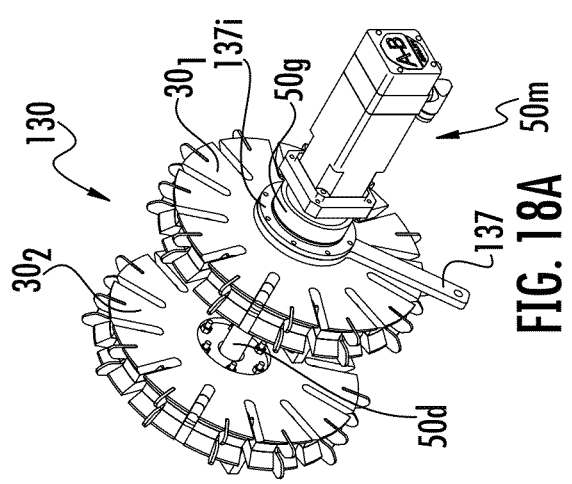
FIG. 18A is a side perspective view of an exemplary wheel assembly according to embodiments of the present invention.

FIGS. 12A and 12B illustrate the apparatus 10' without the external housing shell. As shown, the apparatus 10' includes fiber tension members 15' that guide and apply tension to fiber bundles 25 as they are pulled through and/or past the clipper 20 and onto the respective wheel 30. The fiber tension and guide members 15' can include cooperating leading and rear members, 15f, 15r, respectively. The wheels $30_1$, $30_2$ can be rotated in concert using a common drive shaft 50d as shown. However, in other embodiments, each wheel 30 can have its own drive shaft and drive, or one drive may rotate the different wheels in different sequences rather than in concert. The drive shaft 50d can be in communication with a single electric drive motor 50m (FIG. 12A) that can include an associated gearbox (FIGS. 18A, 18B). Suitable drive motors and gear boxes are well known to those of skill in the art. Also, other drive systems can be used including, chain, belt and the like.

Figure 13:
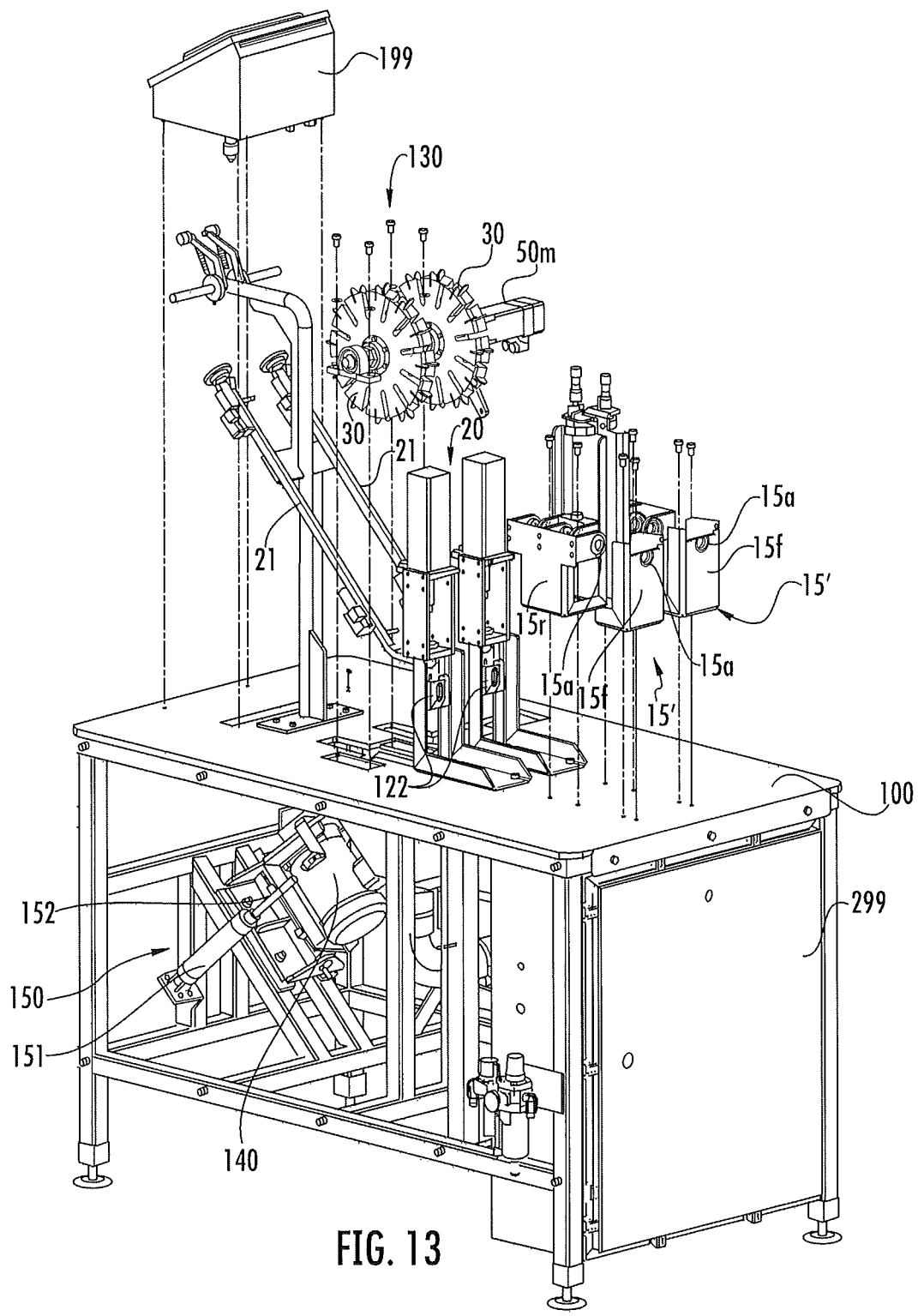
FIG. 13 is a partially exploded side perspective view of the device shown in FIGS. 11, 12A, and 12B according to embodiments of the present invention.
Figure 14:
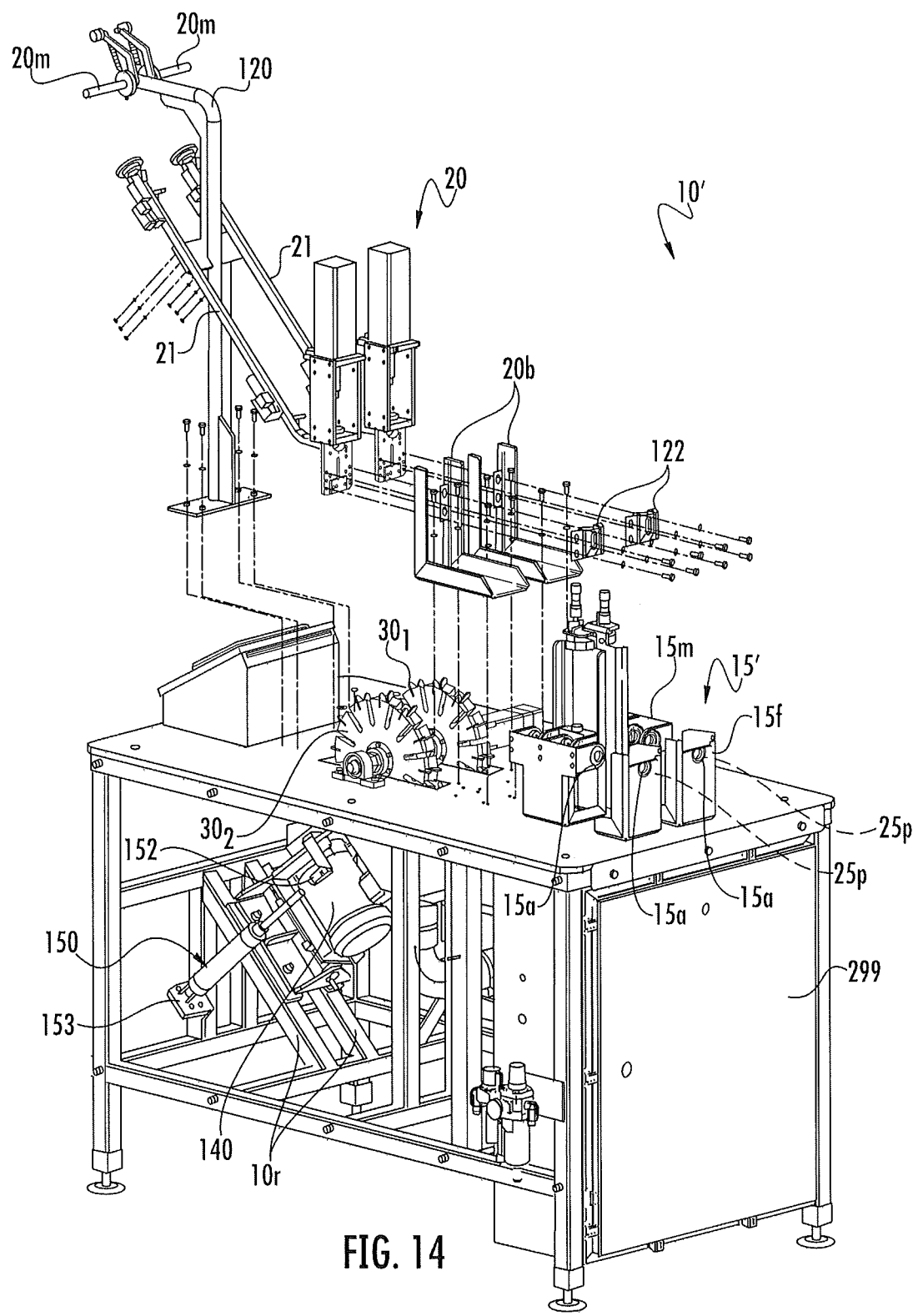
FIG. 14 is another partially exploded view of the device shown in FIGS. 11, 12A and 12B according to embodiments of the present invention.

Referring to FIGS. 13 and 14, the fiber entry aperture 122 of each (side-by-side) fiber bundle travel path 25p (FIGS. 12A, 14) is shown. The entry aperture 122 is aligned with the guide member apertures 15a. The fiber bundles 25b are fed toward the wheel 30 as shown by the broken line arrows (pulled in tension) through the respective aligned apertures 15a, 122, clipped and pulled onto the corresponding wheel 30. The entry aperture 122 is in line with a vertical clip delivery path of the clipper 20 and can be held a distance above the platform 100 substantially aligned with an upper perimeter location of the proximate wheel 30. The apertures 122 can be defined by tapered rounded guide members of a suitable material that facilitates the tensioned pulling of the fibers without undue fraying or the like that can be held by the clipper mounting bracket(s) 20b rather than defined by apertures, slots or gaps in the clipper mounting bracket itself. The guides can comprise a ceramic and/or lubricious material. However, as noted above, the entry apertures can be provided in other manners.

Figure 15:
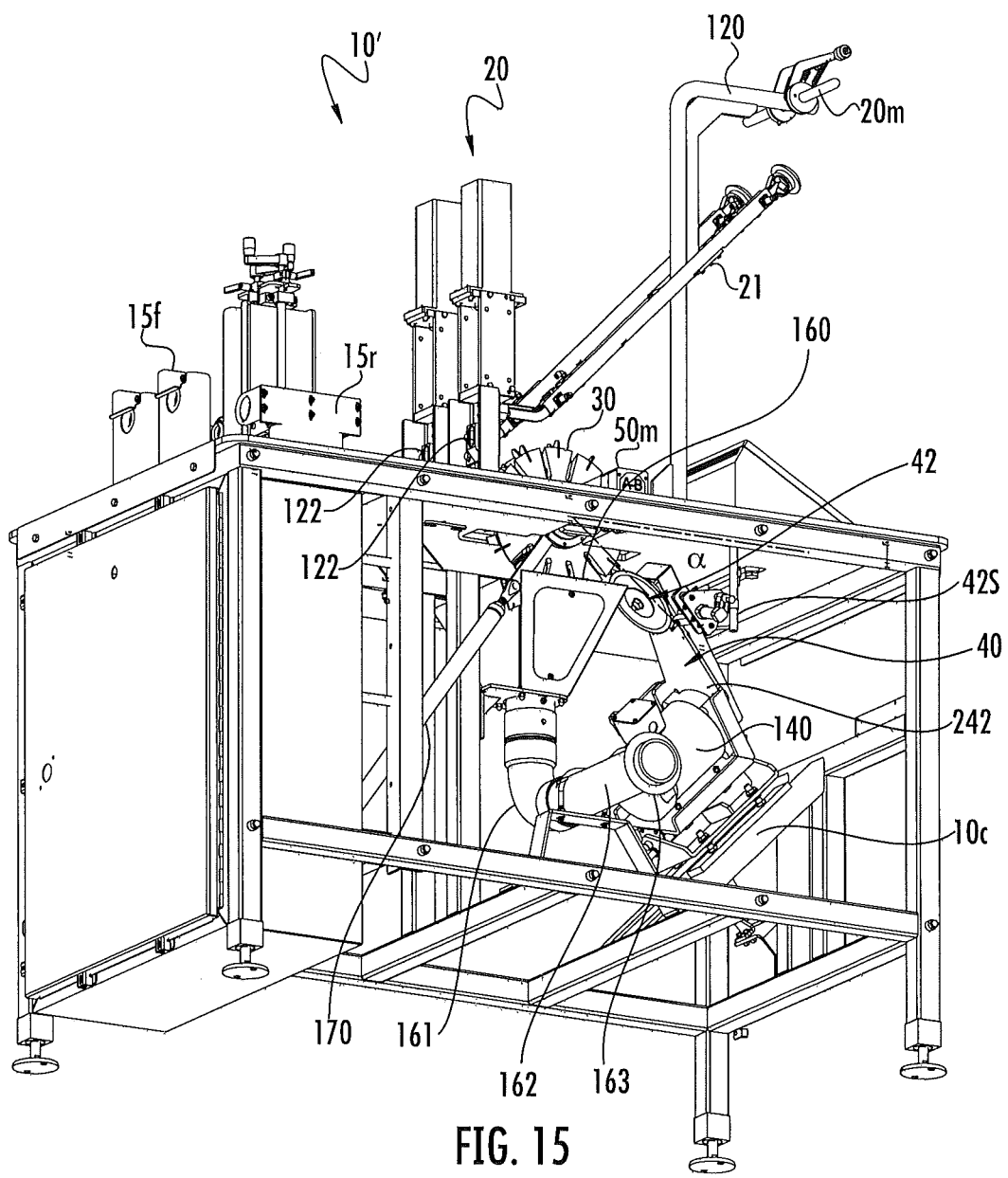
FIG. 15 is a bottom side perspective view of the device shown in FIGS. 11, 12A and 12B according to embodiments of the present invention.

FIGS. 13-15 also illustrate a cutting mechanism drive motor 140 for driving the cutting blade 42 of the cutting mechanism 40. As shown in FIG. 15, the cutting blade 42 can reside proximate to a lower side portion of the wheel(s) 30. The cutting blade 42 can be oriented at an angle α, typically between about 15-75 degrees, and more typically between about 30-60 degrees, such as about 45-60 degrees. The blade 42 can be aligned with a lower side portion of the wheel 30, or can move in to cut in line with a cutting channel 34. The blade 42 can move toward and orthogonal to a plane defined by a laterally extending portion of the wheel to be able to push the fiber bundle into the cutting channel 34 of the wheel to cut segments of the fiber bundle into fiber balls.

FIGS. 13 and 14 show that the cutting mechanism 40 can reside on angled frame rails 10r in communication with an actuator 150, typically a pneumatic cylinder 151 and rod 152, that can move up and down. The lower portion of the actuator 150 (e.g., end of the cylinder) can be held on a pivot bracket 153. The upper end can be attached to a clevis 152. The actuator 150, pivot bracket 153 and clevis 152 can move the blade 42 forward to an operative cutting position on the wheel 30 and may also move the cutting blade 42 and back and forth to cut fibers on both wheels 30. The actuator 150 can be synchronized with the index cycle of the wheels to move forward to cut fibers on both wheels $30_1$, $30_2$, when they have indexed a distance and are temporarily halted for cutting. The actuator 150 can have a suitable stroke distance, typically between about 1-10 inches, and more typically about 5 inches.

The actuator 150 can be configured to move the cutting mechanism 40 forward to cut across two fiber bundles, one on each wheel during a first indexed stop for a first cutting operation, then stop at a first forward stop position. The actuator 150 and cutting member 40 can then be configured to return the cutting mechanism 40 to cut in a reverse direction across the two sets of fibers at the next indexed stop of the wheels, then stop at a second rearward stop position.

FIG. 15 illustrates that the apparatus 10' may optionally include a blade sharpener 42s that can be electronically activated to deploy to automatically sharpen the blade 42. The sharpener 42s can be deployed by a user via the HMI, for example, or may be deployed after a defined number of cycles or defined lengths of fiber bundles, at every shift or at other time or operational intervals. The blade sharpener 42s can include a pneumatic cylinder 151 that drives a motor mount (e.g., clevis) up and down, which carries the blade sharpener 42s to contact the blade 42.

FIG. 15 also illustrates that the apparatus 10' can include a fiber ball chute 160 that merges into an elbow 161 and pipe 162, then into an exit grommet 163 for collecting formed fiber balls 25ba11. The grommet 163 can be connected to a bin, bag, chute or other collection container. The grommet 163 may be in communication with a vacuum source for pulling the fiber balls 25ba11 to a collection container. In other embodiments, the chute 160 can be in communication with a pressurized air or gas source for pushing the fiber balls out. Gravity fed exit paths may also be used.

Referring again to FIG. 15, the apparatus 10' may also include a torque rod assembly 170 that attaches to a torque adjuster arm 137 held by the wheel assembly 130 (FIGS. 18A, 18B) to provide an anti-rotational support for the gear box 50g (FIGS. 18A, 18B). This configuration also allows the upper surface of the platform to be more open (by not placing the anti-rotation or shaft 50d/gear box 50g support device above the platform).

Figure 17:
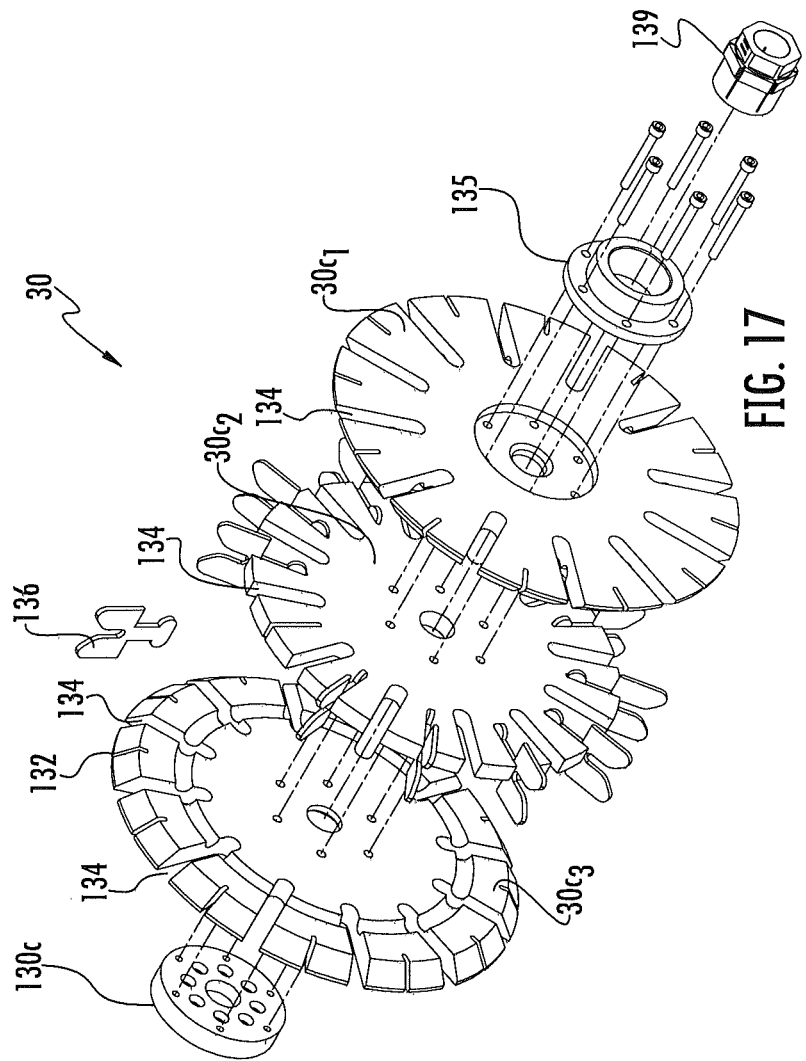
FIG. 17 is an exploded view of the wheel shown in FIG. 16.

FIGS. 16 and 17 illustrates an example of a wheel 30 that may be used in the apparatus 10, 10'. As shown, the wheel 30 includes a plurality of cooperating cylindrical members 30c, each having radially-extending slots 134 that align to form the cutting channels 34. As shown, the wheel 30 includes three cooperating members (but more or fewer may be used), including first and second outer flange members $30c_1$, $30c_3$ and an intermediate member $30c_2$ sandwiched therebetween. As also shown, the cooperating wheel members 30c also include short slots 132 that align to hold fork members 136. The wheel 30 can hold a plurality of circumferentially spaced apart fork members 136, such as at least three, but typically between 6-35, more typically between 8-20, shown as 12. The number of slots 134 for the cutting channels 34 can also vary, and can include at least three, typically between 6-35, and more typically between 8-20, shown as 12. The number and spacing of slots 132, 134, cutting channels 34 and forks 136 can vary depending on the size of the wheel 30 and desired fiber ball diameter and the like. The fork members 136 define the shallow channels 33 for the clips of the fiber bundles. The cooperating members 30c can be attached using flange 135, keyless bush 139 and coupler 130c. Where used, a second wheel $30_2$ can have the same configuration, but is not required to have the coupler 130c (instead merely end nuts, for example). The coupler 130c is used to connect to the motor gearbox interface 137i (FIG. 18B) according to particular embodiments.

Figure 18C:
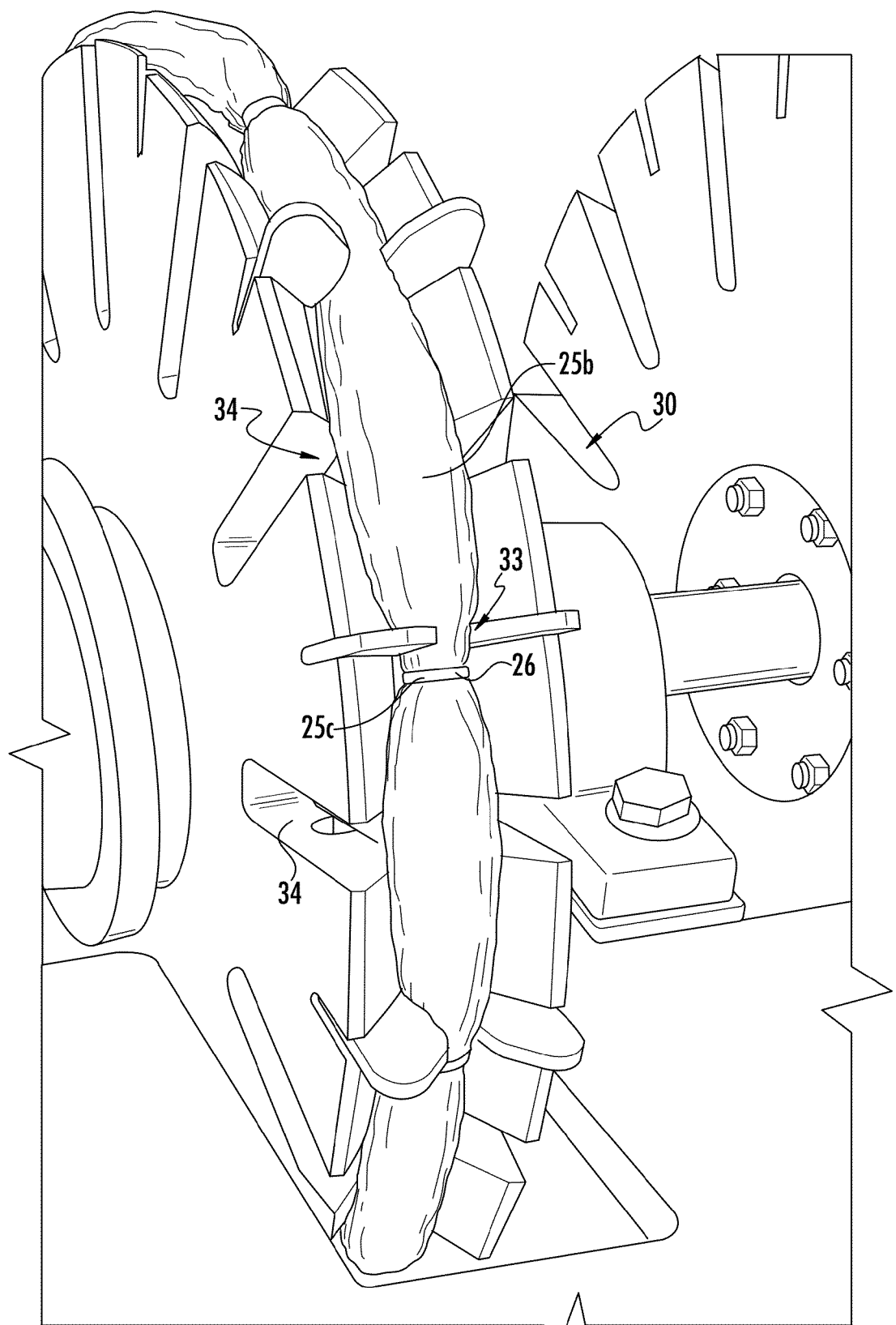
FIG. 18C is an enlarged front perspective view of a portion of a wheel of the assembly shown in FIG. 18A with fibers thereon according to embodiments of the present invention.

FIGS. 18A and 18B illustrate an example of a wheel shaft assembly 130 according to embodiments of the invention. As shown, the assembly 130 includes a drive shaft 50d for the wheels $30_1$, $30_2$ and a motor coupling interface 137i as well as bearings 159 that connect to shaft 50d. FIG. 18C is an enlarged view of one wheel 30 of the wheel assembly 130 in orientation for the apparatus of FIG. 13, shown also holding lengths of clipped segments 25c of fibers 25.

FIGS. 19A and 19B illustrate an example of a cutting mechanism 40. As shown, the cutting mechanism 40 can include the cutter motor 140, blade 42, blade arbor 143, blade retainer 42r, bearing 144, arm bracket 146, cylinder bracket 147, timing pulley 148, timing belt 149, and belt guard 145. The bracket 146 can mount to the frame 10r as shown in FIG. 14. The bracket 146 can include an upwardly extending arm 242 with an upper end portion that supports the blade 42, blade retainer 42r and arbor 143.

Figure 19C:
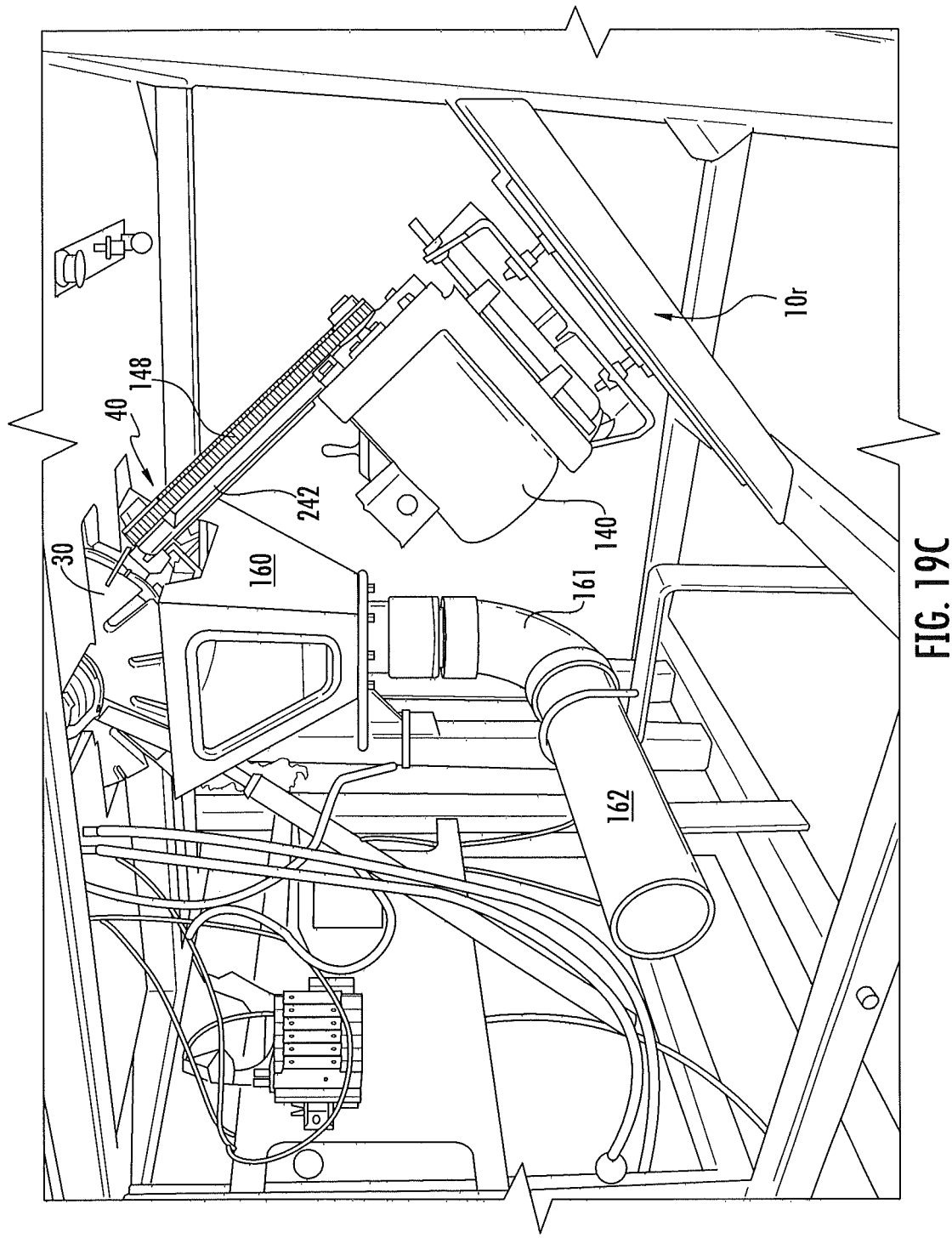
FIG. 19C is a partial view of the apparatus shown in FIG. 11 according to embodiments of the present invention.
Figure 19D:
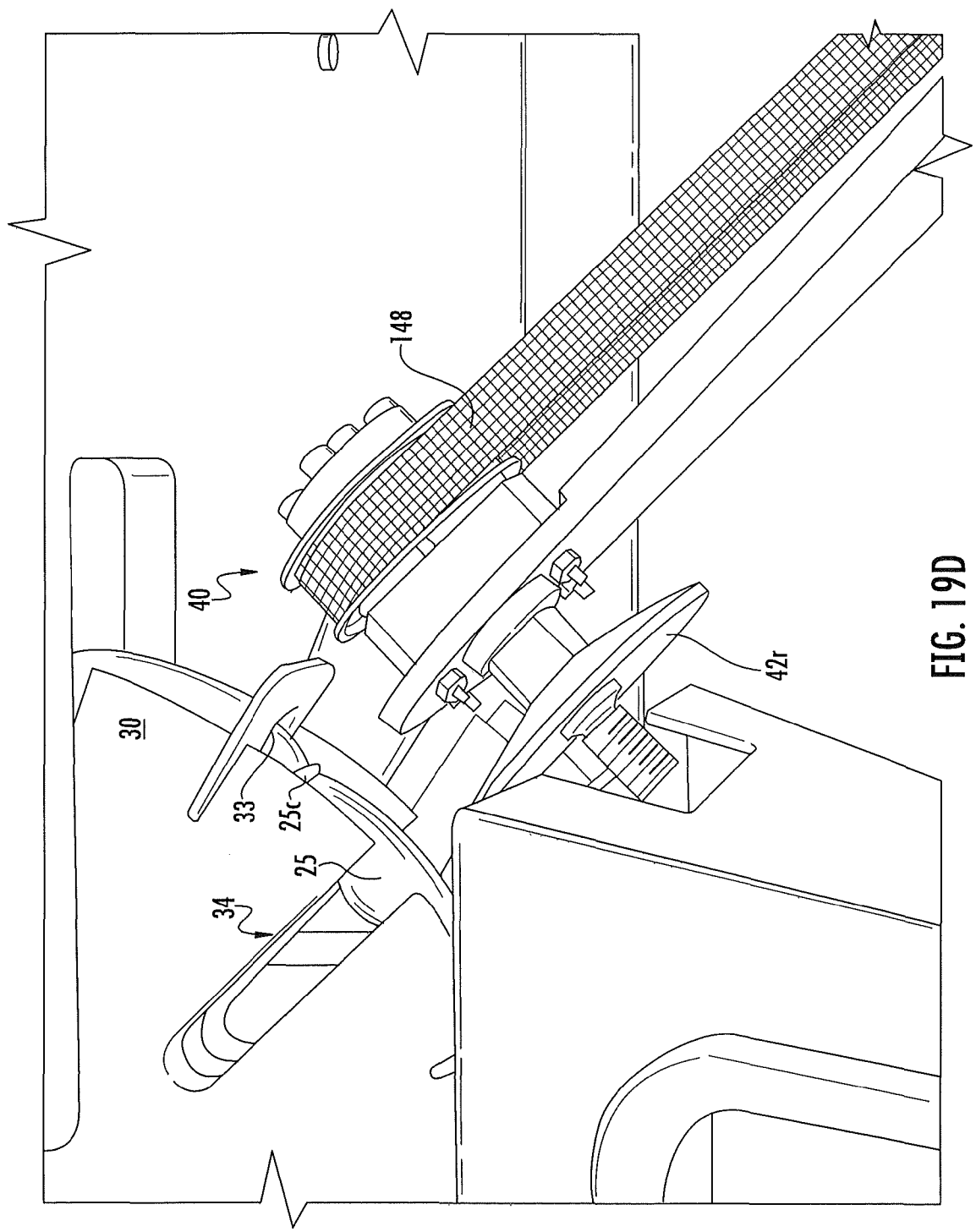
FIG. 19D is an enlarged view of a cutting mechanism shown in FIG. 19C according to embodiments of the present invention.

FIG. 19C illustrates a portion of an underside of the apparatus 10 showing the cutter assembly or mechanism 40 (without the guard 145) in position adjacent the wheels $30_1$, $30_2$. FIG. 19D is an enlarged view of the end of the cutting mechanism 40 that places the blade 42 (FIGS. 19A, 19B) adjacent the wheels $30_1$, $30_2$. It is noted that the blade 42 is not shown in FIGS. 19C and 19D.

FIGS. 19E and 19F show two different stop positions for the arm 242 that places the blade 42 (FIGS. 19A, 19B) at different back and forth positions. Again, the blade 42 is not shown in this figure. Position one is on the left side of the first wheel $30_1$ while position two is on the right side of the second wheel $30_2$. Thus, in operation, the arm 242 with the blade 42 reciprocates (moves back and forth) between these stop positions. During the movement from the first position to the second position, the blade 42 cuts across fibers held by both wheels $30_1$, $30_2$ in a single pass, first fibers held at a cut position on wheel one $30_1$, then fibers held at a cut position on wheel two $30_2$, when those wheels $30_1$, $30_2$ are in a stop interval of their indexed rotational movement. Next, the arm and blade 242, 42 move from the second position to the first position, synchronized with the next stop interval of the wheels $30_1$, $30_2$, so that cutting blade (or knife) 42 cuts in a single pass across the fibers at the cut position on the second wheel $30_2$, then the fibers at the cut position on the first wheel $30_1$. Thus, in some embodiments, the arm 242 with blade 42 can pivot back and forth between two defined stop positions that positions the blade close to but spaced apart from a respective adjacent wheel, substantially synchronized with the stop interval of the wheels in response to movement of the actuation cylinder 150 that pivots the motor assembly 140 (FIG. 13).

FIG. 19D also shows that the collection chute 160 can span and reside under, closely spaced to, both wheels $30_1$, $30_2$ (alternately, separate collection chutes may be used).

FIGS. 20A and 20B illustrate an example of a tension guide member 15' that can be the rear member 15r shown in FIGS. 11-15, for example. The tension guide member 15' can be used alone or with other lead members. As shown, the tension guide member 15' includes a tension stand 250 with a plurality of rings 251 that define the apertures 15a through which the fibers are drawn or pulled. The rings 251 can be ceramic rings 251 that are held by ring stands 251h and attached using retaining members 252, which can be retaining ring 252 such as metal or elastomeric O-rings or snap rings. However, other materials, members and/or configurations for providing the tension, guiding and/or apertures 15a can be used.

Some of the rings 251 can be stationary (shown as 251s) and some can move (shown as 251m). In other embodiments, all can move, e.g., some up and some down. As shown, the movable rings 251m are held by a tension block 254 which is adjustably held in the tension stand 250. As shown in FIG. 20A, the stationary rings are interleaved with the movable rings 251m. The stationary rings face toward the block 254 and the movable ones face away from the block 254 to that the apertures of each ring 251 are substantially aligned.

The tension guide member 15' can include an upwardly extending lead screw 255 that is attached to the block 254 and to a hand crank 258. A stop plate 256 can be attached to an upper ledge of the tension stand 250. The tension guide member 15' can also include upper and lower supports 259 that can engage the lead screw 255. The crank 258 can be rotated to turn the lead screw 255 causing the block 254 to move up and down, thereby moving the block 254 with rings 251 up and down relative to the stationary rings 251s to adjust tension on the fibers. In some embodiments, a user rotates the hand crank 258 to move the center rings in the line of rings (shown as two of the substantially aligned five rings) up after a leading end of fibers are fed through the rings to provide a desired tension. Of course, the tension can be adjusted or applied at other times as well. Typically, the shaft or lead screw 255 remains stationary while the block 254 moves in response to rotation of the hand crank 258. It is noted that an automated crank may also or alternatively be used as well as other tension adjustment members.

Figure 21:
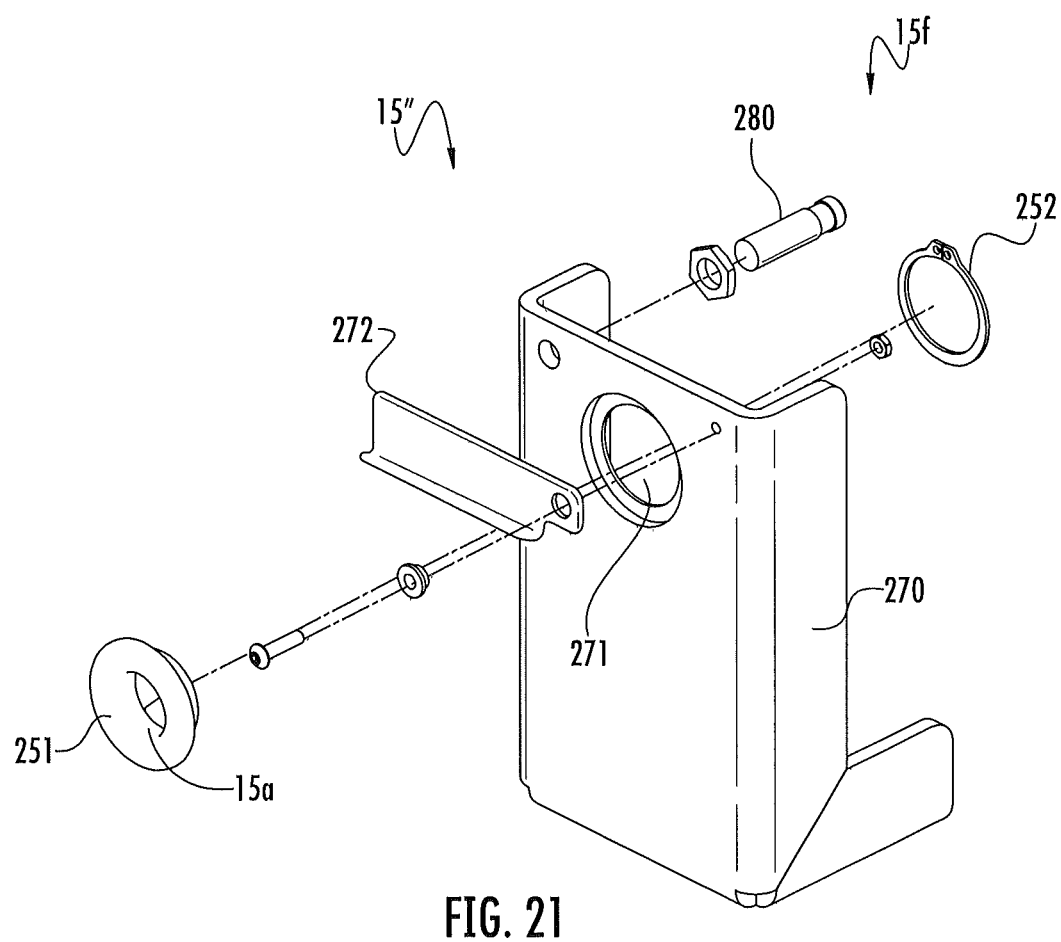
FIG. 21 is an exploded view of a fiber guide member according to embodiments of the present invention.

FIG. 21 illustrates a fiber guide 15" that may be suitable for the forward guide member 15f shown in FIGS. 11-15, for example. As shown, the guide 15" can include a guide housing 270 with an aperture 271 sized to receive a ring 251 defining the fiber receiving aperture 15a. A retaining member 252 can be used to attach the guide ring 251 to the housing 270. The same guide ring as shown in FIGS. 20A, 20B can be used or a different shaped, sized and/or different material ring can be used. A sensor 280 such as a proximity switch, Hall effect or optic sensor can also be mounted to the housing 270. The sensor 280 can communicate with the controller 90 and/or HMI 199 to flag an out of fiber product condition. A free-floating flag 272 can ride on a bundle of fibers and can be pivotably attached to the housing 270 to extend over a top portion of the leading aperture 271. When the fibers are depleted or cut, the flag 272 rotates down which causes the sensor to indicate an out of fiber condition. This sensor 280 can have a short range (be mounted close to the fibers), such as about a 4 mm range, and can be monitored and data from the sensor can be used to automatically stop operation of the apparatus 10, 10' and/or direct an operator to reload more fibers and the like when an out of product condition is detected.

Figure 22:
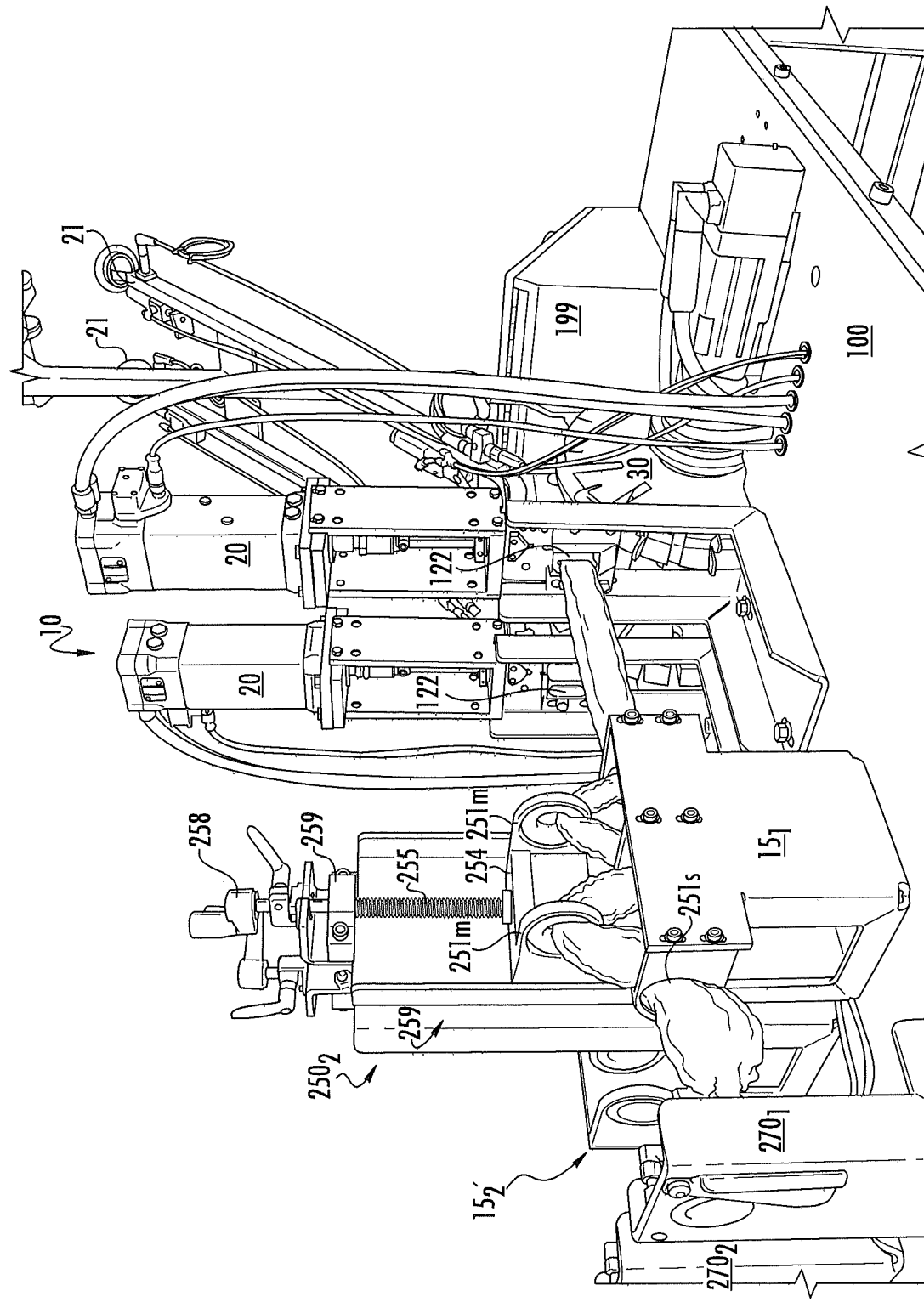
FIG. 22 is a side perspective view of a fiber forming apparatus with exemplary lengths of fibers (tow) according to embodiments of the present invention.

FIG. 22 is a side perspective view of the fiber-ball apparatus 10 with fibers 25 (tow) held thereon shown threaded through the tension stand 250. As also shown, there are two sets of tension guides $15'_1$ and $15'_2$, including front tension guide $270_1$, $270_2$ and the tension stand 250, residing closely spaced to each other upstream of respective clippers 20 and wheels 30. The fibers 25 can be fed from a box of coiled or wound tow or in spools or any other suitable source. The fibers 25 extend through the guide housing 270 through the apertures 15a then to the passage 122 in the clipper die support 122. The crank 258 at the top allows for tensioning. The screw shaft 255 can pull the two tighter with every hand crank turn or number of turns.

Figure 23:
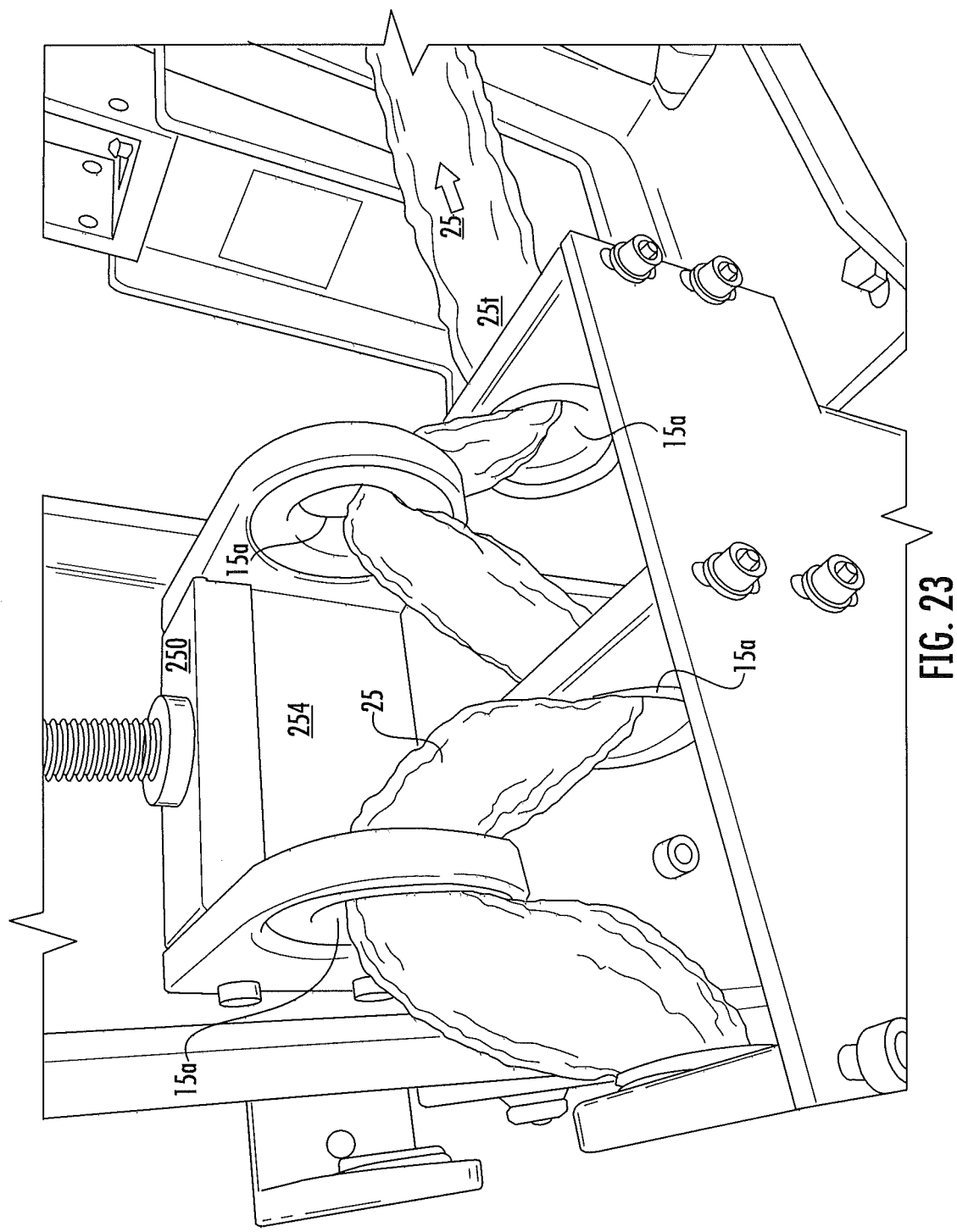
FIG. 23 is an enlarged view of the tension block shown in FIG. 22 according to embodiments of the present invention.

FIG. 23 is an enlarged view of the tension stand 250 illustrating the relative up and down position of adjacent ones of the apertures 15a that provides (adjustable) tension 25t.

Figure 24:
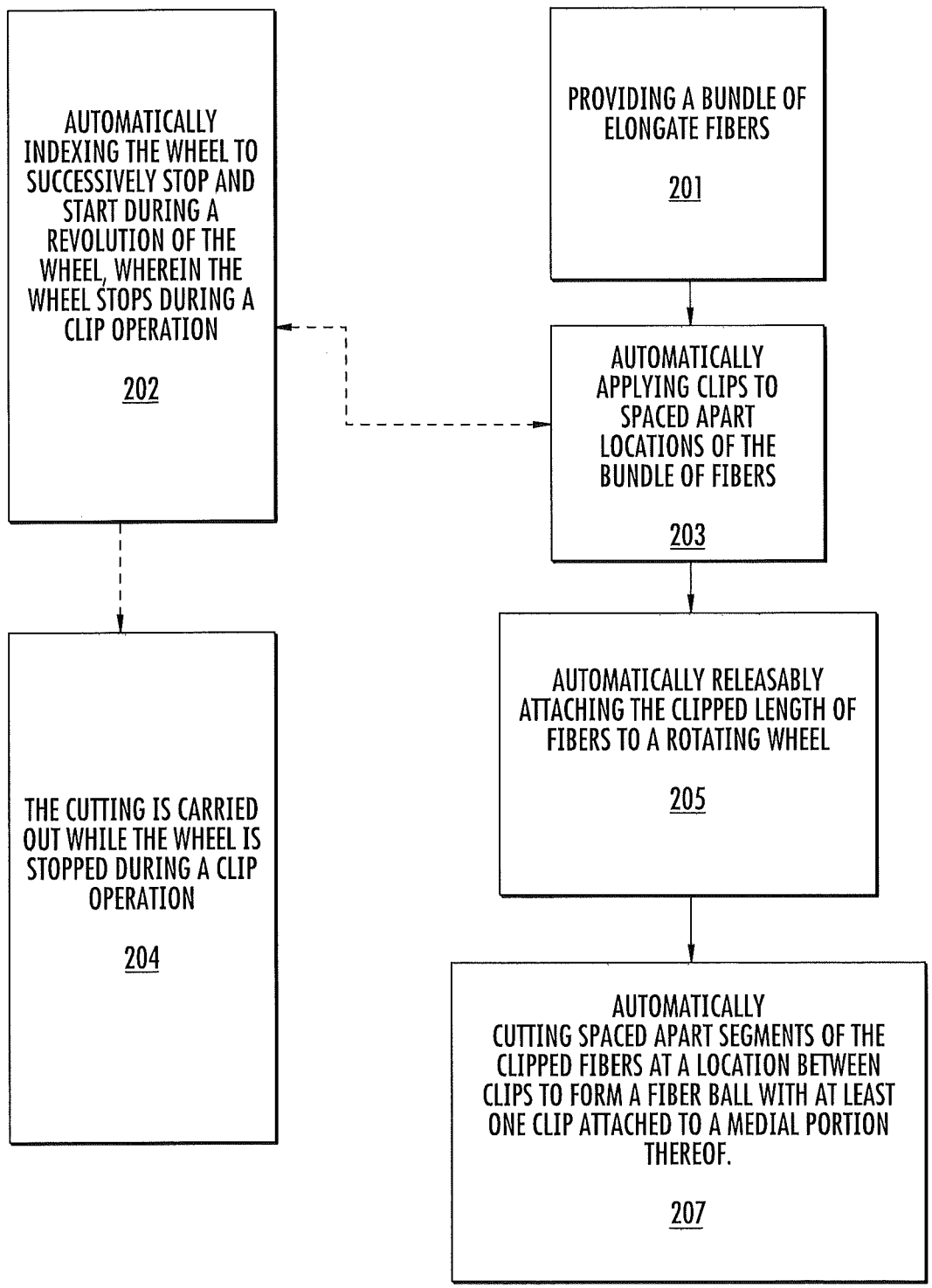
FIG. 24 is a flow chart of operations that may be carried out according to embodiments of the present invention.

FIG. 24 is a flow chart of examples of operations that can be carried out to produce fiber balls. A bundle of elongate fibers are provided (block 201). The fibers can be provided from a separate or a common spool or other supply. Clips are automatically applied to spaced apart locations of the bundle of fibers (block 203).

The clipped fibers may be attached to a rotating wheel (block 205). Spaced apart segments of the clipped fibers are separated (e.g., cut apart) at a location between clips to form a fiber ball with at least one clip attached to a medial portion thereof (block 207).

In some embodiments, the wheel can be automatically indexed to successively stop and start during a revolution of the wheel so that the wheel stops during a clip operation (block 202). The cutting can be carried out automatically while the wheel is stopped during a clip operation (e.g., synchronized to the clipping operation) (block 204). More than one wheel may be used or the wheel can hold more than one set of fiber bundles.

Figure 25:
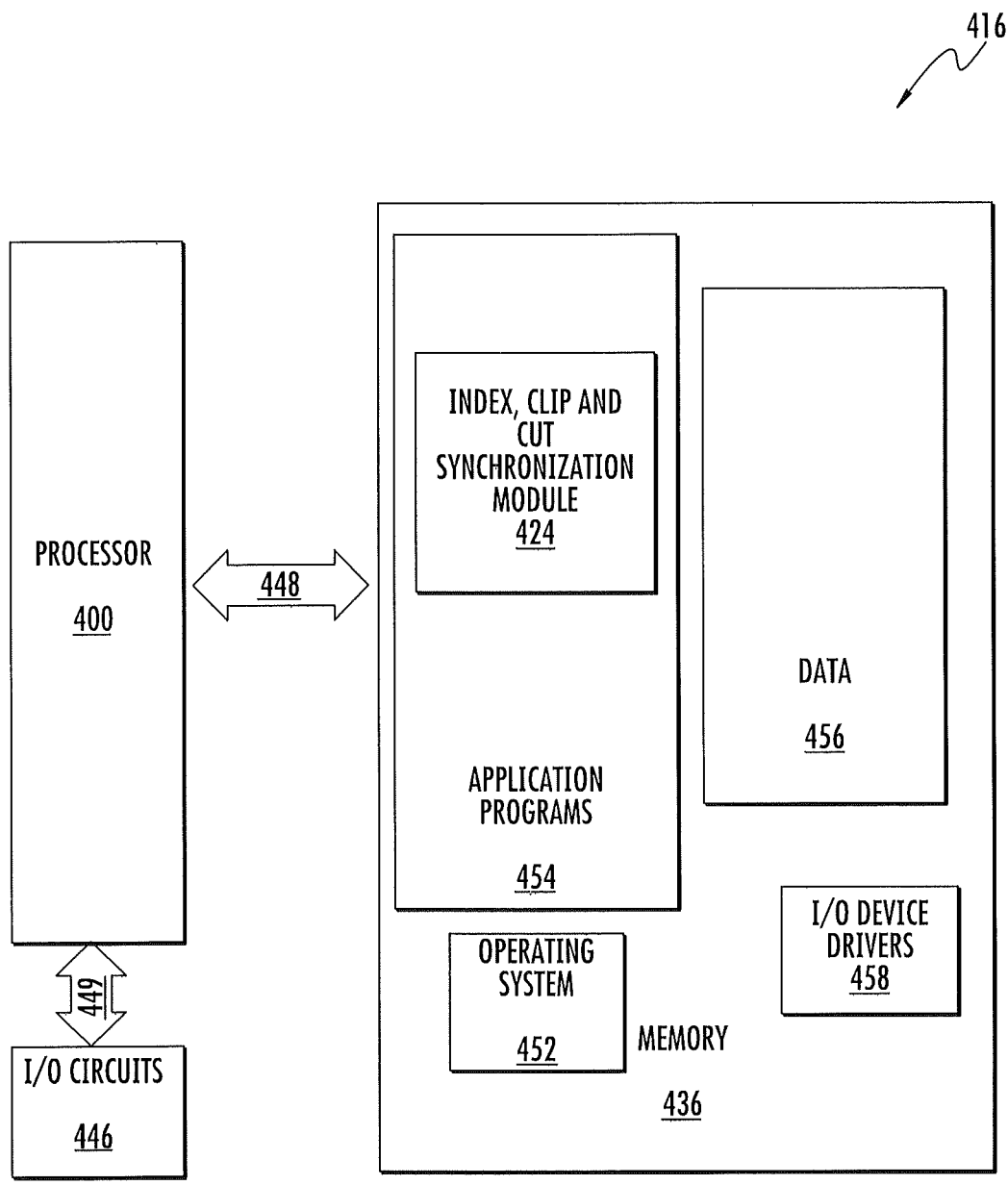
FIG. 25 is a block diagram of a data processing system according to embodiments of the present invention.

FIG. 25 is a block diagram of an example of data processing systems 416 in accordance with embodiments of the present invention. The processor 400 communicates with the memory 436 via an address/data bus 448. The processor 400 can be any commercially available or custom microprocessor. The memory 436 is representative of the overall hierarchy of memory devices containing the software and data used to implement the functionality of the data processing system 416. The memory 436 can include, but is not limited to, the following types of devices: cache, ROM, PROM, EPROM, EEPROM, flash memory, SRAM, and DRAM.

As shown in FIG. 25, the memory 436 may include several categories of software and data used in the data processing system 416: the operating system 452; the application programs 454; the input/output (I/O) device drivers 458; the Index, Clip and Cut Synchronization Module 424; and the data 456.

The data 456 may include a look-up chart of different index patterns, different clip times, rpm speed, stop, start intervals, cutting member stroke distance, and the like. The data 456 may include data from a proximity sensor, e.g., sensor 280 that allows the computer program to automatically control the operation of the apparatus to inhibit clipping or indexing when a length of fibers has been expended.

As will be appreciated by those of skill in the art, the operating system 452 may be any operating system suitable for use with a data processing system, such as OS/2, AIX, DOS, OS/390 or System390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, LabView, or proprietary operating systems such as an Allen-Bradley touch screen operating system or interface (UI) by Rockwell Inc. The I/O device drivers 458 typically include software routines accessed through the operating system 452 by the application programs 454 to communicate with devices such as I/O data port(s), data storage 456 and certain memory 436 components. The application programs 454 are illustrative of the programs that implement the various features of the data processing system 416 and preferably include at least one application which supports operations according to embodiments of the present invention. Finally, the data 456 represents the static and dynamic data used by the application programs 454, the operating system 452, the I/O device drivers 458, and other software programs that may reside in the memory 436.

While the present invention is illustrated, for example, with reference to the Module 424 being an application program in FIG. 25, as will be appreciated by those of skill in the art, other configurations may also be utilized while still benefiting from the teachings of the present invention. For example, the Module 424 may also be incorporated into the operating system 452, the I/O device drivers 458 or other such logical division of the data processing system 416. Thus, the present invention should not be construed as limited to the configuration of FIG. 25, which is intended to encompass any configuration capable of carrying out the operations described herein.

The I/O data port can be used to transfer information between the data processing system 416 and the clipper 20, wheel 30 and/or cutting mechanism 40 or another computer system or a network (e.g., the Internet) or to other devices controlled by the processor. These components may be conventional components such as those used in many conventional data processing systems which may be configured in accordance with the present invention to operate as described herein.

While the present invention is illustrated, for example, with reference to particular divisions of programs, functions and memories, the present invention should not be construed as limited to such logical divisions. Thus, the present invention should not be construed as limited to the configuration of FIG. 25 but is intended to encompass any configuration capable of carrying out the operations described herein.

The flowcharts and block diagrams of certain of the figures herein illustrate the architecture, functionality, and operation of possible implementations of selective implementation of fiber ball formation means using at least one clipper according to the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An apparatus for forming fiber balls, comprising:
   at least one automated clipper;
   at least one wheel in cooperating alignment with the at least one clipper configured to rotate and releasably engage lengths of fibers;
   a table that holds the at least one clipper and the at least one wheel;
   a drive system in communication with the at least one wheel to rotate the at least one wheel; and
   at least one cutting mechanism in cooperating alignment with the at least one wheel.

2. The apparatus of claim 1, wherein the at least one wheel comprises a plurality of releasably attachable cylindrical members, each cylindrical member having radially extending slots that align, some of which define cutting channels and some of which hold forks that engage clips.

3. The apparatus of claim 1, wherein the at least one clipper comprises first and second clippers held side-by-side on the table, wherein the at least one wheel comprises first and second wheels held on the table, the first wheel cooperating with the first clipper and the second wheel cooperating with the second clipper, the apparatus further comprising a controller in communication with the clippers, wheels, the at least one cutting mechanism and the drive system, and wherein the controller directs the wheels to index to stop a plurality of times per revolution.

4. The apparatus of claim 1, further comprising a controller in communication with the drive system and the at least one clipper, wherein the controller is configured to direct the drive system to stop the at least one wheel as the clipper applies a clip to a segment of bundled fibers at a location that is upstream of a respective wheel.

5. The apparatus of claim 1, wherein the wheel is indexed to stop and advance a plurality of times per revolution of the at least one wheel, wherein the at least one cutting mechanism is configured to travel to a cutting position when the wheel is stopped, and wherein the table comprises a top surface with at least one open space that is in cooperating alignment with the at least one wheel and defines an exit path for fiber balls cut from the at least one wheel.

6. The apparatus of claim 1, further comprising a controller in communication with the at least one clipper and the at least one cutting mechanism to synchronize a clipping operation with a cutting operation.

7. The apparatus of claim 1, wherein the at least one wheel comprises first and second spaced apart wheels held on the table, and wherein the first and second wheels are both attached to a common drive shaft of the drive system, and wherein the drive system comprises an electric motor with a gearbox that drives the first and second wheels to index in concert.

8. The apparatus of claim 1, wherein the at least one wheel has an outer perimeter with circumferentially spaced apart, radially-extending cutting channels, and wherein the cutting mechanism has a blade that, in operation, moves across the cutting channel to cut fibers held thereat.

9. The apparatus of claim 1, wherein the at least one clipper comprises first and second clippers held side-by-side on the table, wherein the at least one wheel comprises first and second aligned wheels, the first wheel proximate to and cooperating with the first clipper, the second wheel proximate and cooperating with the second clipper, wherein the wheels are synchronized to index together, and wherein the at least one cutting mechanism has a cutting member that cuts across fiber bundles held on the aligned wheels in a forward direction during a first indexed stop of the wheels, then stops during indexed movement of the wheels, then cuts across fibers held on the wheels in a reverse direction during a second indexed stop of the wheels.

10. The apparatus of claim 1, further comprising a plurality of guide members having substantially aligned apertures residing on the table upstream of the at least one clipper, and a bundle of elongate fibers extending from at least one supply source residing upstream of the at least one clipper through the aligned apertures.

11. An apparatus for forming fiber balls, comprising:
    at least one automated clipper;
    at least one wheel in cooperating alignment with the at least one clipper configured to rotate and releasably engage lengths of fibers;
    a drive system in communication with the at least one wheel to rotate the wheel;
    at least one cutting mechanism in cooperating alignment with the at least one wheel; and
    a table with a top surface that holds the at least one clipper, wherein the table top surface includes at least one aperture or open space that allows a lower portion of the at least one wheel to reside under the table top surface, and wherein the at least one cutting mechanism is a single cutting mechanism that resides under the table top surface.

12. An apparatus for forming fiber balls, comprising:
    at least one automated clipper;
    at least one wheel in cooperating alignment with the at least one clipper configured to rotate and releasably engage lengths of fibers;
    a drive system in communication with the at least one wheel to rotate the wheel; and
    at least one cutting mechanism in cooperating alignment with the at least one wheel,
    wherein the cutting mechanism has a drive that is configured to synchronize cutting with a stop interval of the at least one wheel and cut through fibers held over a cutting channel in a forward direction, then stop at a stop position, then travel in a reverse direction at a next indexed stop of the at least one wheel to cut through fibers held over another cutting channel on the at least one wheel.

13. A method of making fiber balls, comprising:
    providing a bundle of elongate fibers;
    providing a table holding at least one automated clipper and at least one wheel;
    automatically serially applying clips to the bundle of elongate fibers at longitudinally spaced apart locations; then
    wrapping a segment of the clipped bundle of fibers on an outer perimeter portion of the wheel;
    rotating the wheel holding the segments of the clipped bundle of fibers; and then
    automatically serially cutting the segments of the clipped bundle of fibers to form fiber balls.

14. The method of claim 13, wherein the rotating is carried out by indexing the wheel to stop and advance a number of times per revolution, and wherein the cutting step is carried out to serially cut segments of the clipped bundle of fibers while on the wheel to release the cut segments of the clipped bundle of fibers from the wheel to form the fiber balls.

15. The method of claim 14, wherein the rotating comprises automatically indexing the wheel with the bundles of fibers with the clips to successively advance and stop a number of times per revolution of the wheel, wherein the clipping and cutting operations are carried out substantially concurrently while the wheel is stopped.

16. The method of claim 13, further comprising holding the clipped bundle of fibers against an outer perimeter of the rotatable wheel, with spaced apart clips held in forks that have radially extending slots that extend outwardly a distance beyond radially-extending cutting channels on an outer perimeter of the wheel, and wherein the cutting operation is carried out by cutting the fibers between adjacent clips.

17. The method of claim 16, wherein the cutting operation is carried out by extending a cutting member into the cutting channel to cut the fibers to form the fiber balls.

18. The method of claim 13, wherein the clipping operation is carried out to apply clips between about every 1-5 inches along a stretched length of the fiber bundle.

19. The method of claim 13, wherein the method forms between about 40-200 fiber balls per minute.

20. The method of claim 14, wherein the rotating comprises automatically indexing the wheel with the clipped bundles of fibers to successively start and stop at least about three times per revolution of the wheel.

21. A method of making fiber balls, comprising:
providing a bundle of elongate fibers;
automatically serially applying clips to the bundle of elongate fibers at longitudinally spaced apart locations;
wrapping the bundle of fibers with clips on a wheel indexed to stop and advance a number of times per revolution; then
automatically serially cutting segments of the clipped bundle of fibers to form fiber balls,
wherein the cutting step is carried out to serially cut segments of the bundle of fibers while the bundle of fibers with clips is on the wheel to form the fiber balls, and
wherein the at least one wheel comprises first and second wheels, the method further comprising automatically indexing the first and second wheels with respective clipped bundles of fibers to successively start and stop in concert a number of times per revolution of the wheel, wherein the cutting operation is synchronized to move the cutting member to cut in a forward direction across both wheels during a first stop, the cut in a reverse direction across both wheels during a next successive stop.

22. A method of making fiber balls, comprising:
pulling first and second bundles of elongate fibers in tension past respective first and second automated clippers held side-by-side on a table; then
automatically serially applying clips to the first and second bundles of fibers substantially in concert with respective first and second automated clippers; then
pulling the first and second bundles of fibers onto respective first and second rotatable wheels held on the table downstream of the first and second clippers with the first and second bundles of fibers stretched;
indexing the wheels to stop and advance a plurality of times substantially in concert per revolution of the wheels; and
automatically serially cutting segments of the first and second clipped bundle of fibers while held on the respective first and second wheels to release clipped segments and form fiber balls.

23. An apparatus for forming fiber balls, comprising:
a plurality of clippers;
a plurality of rotating wheels held on a common shaft, at least one wheel in cooperating alignment with a respective clipper configured to rotate and releasably engage lengths of fibers;
a drive system in communication with the shaft holding the wheels configured to index the wheels to stop and advance a plurality of times per revolution; at least one cutting mechanism in cooperating alignment with the wheels; and
a table that holds the drive shaft and the clippers, wherein the table has a top surface that includes apertures or gap spaces that allow a lower portion of each wheel to reside under the table top surface.

24. The apparatus of claim 23, wherein the wheels are closely spaced apart a distance of between 1-10 inches and have a horizontal axis of rotation defined by the shaft.

25. An apparatus for forming fiber balls, comprising:
a plurality of clippers;
a plurality of rotating wheels held on a common shaft, at least one wheel in cooperating alignment with a respective clipper configured to rotate and releasably engage lengths of fibers;
a drive system in communication with the shaft holding the wheels configured to index the wheels to stop and advance a plurality of times per revolution; and
at least one cutting mechanism in cooperating alignment with the wheels,
wherein the at least one cutting mechanism is a single cutting mechanism that resides under the table top surface and is configured to cut through fibers held on each wheel in a forward direction, then stop and travel in a reverse direction, to cut through fibers held on each wheel at a next indexed stop.

26. The apparatus of claim 23, wherein the cutting mechanism, comprises:
a motor assembly having a motor held under the table that holds the clippers;
a pulley in communication with the motor;
a bracket holding the motor assembly under the table, the bracket having an upwardly extending arm that holds a cutting blade or knife at an upper portion thereof; and
an actuation cylinder with a rod that resides under the table, the rod attached to the motor assembly to cause the arm with the cutting blade or knife to pivot between two spaced apart stop positions, one stop position residing outside each wheel.

27. The apparatus of claim 23, wherein the drive system includes an electric motor with a gearbox that drives the shaft holding the first and second wheels so that the wheels rotate to index in concert.

* * * * *

UNITED STATES PATENT AND TRADEMARK OFFICE
CERTIFICATE OF CORRECTION

PATENT NO. : 9,169,580 B2  
APPLICATION NO. : 13/674495  
DATED : October 27, 2015  
INVENTOR(S) : Griggs et al.

Page 1 of 1

It is certified that error appears in the above-identified patent and that said Letters Patent is hereby corrected as shown below:

<u>In the Specification:</u>
Column 7, Line 49: Please correct "2Q" to read -- 20 --
Column 8, Line 46: Please correct "**25*ba*11" to read -- 25ball** --
Column 8, Line 64: Please correct "**25*ba*11." to read -- 25ball.** --
Column 9, Line 22: Please correct "**25*ba*11" to read -- 25ball** --
Column 9, Line 25: Please correct "**25*ba*11" to read -- 25ball** --
Column 9, Line 28: Please correct "**25*ba*11" to read -- 25ball** --
Column 9, Line 32: Please correct "**25*ba*11" to read -- 25ball** --
Column 9, Line 37: Please correct "**25*ba*11" to read -- 25ball** --
Column 11, Line 9: Please correct "**25*ba*11" to read -- 25ball** --
Column 11, Line 14: Please correct "**25*ba*11" to read -- 25ball** --
Column 12, Line 32: Please correct "**25*ba*11" to read -- 25ball** --
Column 12, Line 40: Please correct "**25*ba*11." to read -- 25ball.** --
Column 14, Line 31: Please correct "**25*ba*11." to read -- 25ball.** --
Column 14, Line 34: Please correct "**25*ba*11" to read -- 25ball** --

Signed and Sealed this
Twenty-sixth Day of April, 2016

Michelle K. Lee
*Director of the United States Patent and Trademark Office*